United States Patent
Lee et al.

(10) Patent No.: US 10,612,676 B2
(45) Date of Patent: Apr. 7, 2020

(54) CHECK VALVE HAVING REVERSE-DIRECTION FLUID SUPPLY FUNCTION

(71) Applicant: DO QOOM, CORP, LTD, Gyeonggi-do (KR)

(72) Inventors: Sang Heon Lee, Seoul (KR); Dong Il Han, Gyeonggi-do (KR)

(73) Assignee: DO QOOM, CORP, LTD, Gyeonggi-do (KR)

( * ) Notice: Subject to any disclaimer, the term of this patent is extended or adjusted under 35 U.S.C. 154(b) by 130 days.

(21) Appl. No.: 16/069,966

(22) PCT Filed: Jan. 12, 2017

(86) PCT No.: PCT/KR2017/000431
§ 371 (c)(1),
(2) Date: Jul. 13, 2018

(87) PCT Pub. No.: WO2017/123028
PCT Pub. Date: Jul. 20, 2017

(65) Prior Publication Data
US 2019/0017613 A1  Jan. 17, 2019

(30) Foreign Application Priority Data

Jan. 14, 2016  (KR) .................. 10-2016-0004588
Jan. 14, 2016  (KR) .................. 10-2016-0004589
(Continued)

(51) Int. Cl.
*F16K 15/06*  (2006.01)
*F16K 27/02*  (2006.01)
(Continued)

(52) U.S. Cl.
CPC .............. *F16K 15/06* (2013.01); *F16K 15/18* (2013.01); *F16K 27/02* (2013.01); *F16K 39/024* (2013.01);
(Continued)

(58) Field of Classification Search
CPC ....... Y10T 137/7935; Y10T 137/86678; Y10T 137/86686; Y10T 137/86702; F16K 15/06; F16K 15/18; F16K 27/02; F16K 39/024
See application file for complete search history.

(56) References Cited

U.S. PATENT DOCUMENTS 1,676,666 A * 7/1928 Pivoto ................... E21B 21/002
                                                   137/543.15
1,868,165 A * 7/1932 Hammond .............. F16K 15/20
                                                   137/223
(Continued)

FOREIGN PATENT DOCUMENTS

JP    2012087830    5/2012
KR    10-0835860    6/2008
(Continued)

OTHER PUBLICATIONS

International Search Report and Written Opinion issued in International Patent Application No. PCT/KR2017/000431, dated May 8, 2017.

*Primary Examiner* — Marina A Tietjen
*Assistant Examiner* — Frederick D Soski
(74) *Attorney, Agent, or Firm* — Norton Rose Fulbright US LLP

(57) ABSTRACT

A check valve having a reverse-direction fluid supply function capable of supplying a fluid in a reverse direction by opening a fluid passage formed in a central shaft of a disk configured to open or close a flow path. The valve includes a valve main body into which a fluid is introduced, a shaft
(Continued)

installed in the valve main body and configured to move forward toward an inside of the valve main body or backward toward an outside of the valve main body, a disk disposed in the valve main body and configured to open or close the valve main body, and a spring interposed between the disk and an inner surface of the valve main body. The disk opens the valve main body due to fluid pressure and blocks the same when fluid pressure is removed by movement of the shaft or by an elastic reaction force of the spring.

11 Claims, 14 Drawing Sheets

(30) Foreign Application Priority Data

| Feb. 24, 2016 | (KR) | ................. 10-2016-0021977 |
|---|---|---|
| Feb. 24, 2016 | (KR) | ................. 10-2016-0021979 |

(51) Int. Cl.
 *F16K 39/02* (2006.01)
 *F16K 15/18* (2006.01)

(52) U.S. Cl.
 CPC .. *Y10T 137/7935* (2015.04); *Y10T 137/86678* (2015.04); *Y10T 137/86686* (2015.04); *Y10T 137/86702* (2015.04)

(56) References Cited

U.S. PATENT DOCUMENTS

| 2,021,427 | A | * | 11/1935 | Peo | ............... | F16F 9/52 |
|---|---|---|---|---|---|---|
| | | | | | | 188/278 |
| 2,043,489 | A | * | 6/1936 | Peo | ............... | F16F 9/145 |
| | | | | | | 188/309 |
| 2,162,151 | A | * | 6/1939 | Wranosky | ............... | F04B 47/00 |
| | | | | | | 137/454.4 |
| 2,197,606 | A | * | 4/1940 | Birch | ............... | F04B 53/103 |
| | | | | | | 137/516.23 |
| 2,212,600 | A | * | 8/1940 | Harm | ............... | F16K 15/025 |
| | | | | | | 137/193 |
| 2,725,076 | A | * | 11/1955 | Hansen | ............... | F16K 15/063 |
| | | | | | | 137/543.15 |
| 2,731,035 | A | * | 1/1956 | Robert | ............... | G05D 16/18 |
| | | | | | | 137/512.1 |
| 3,007,693 | A | * | 11/1961 | Templeton | ............... | B60G 17/044 |
| | | | | | | 267/64.18 |
| 3,048,188 | A | * | 8/1962 | Hunter | ............... | F16K 17/08 |
| | | | | | | 137/469 |
| 3,395,725 | A | * | 8/1968 | Roach | ............... | F16K 15/044 |
| | | | | | | 137/512.15 |
| 3,559,686 | A | * | 2/1971 | Hoffman | ............... | F15B 13/0405 |
| | | | | | | 137/625.64 |
| 3,727,631 | A | * | 4/1973 | Suezawa | ............... | F16K 11/044 |
| | | | | | | 137/243.2 |
| 3,945,607 | A | * | 3/1976 | Dashner | ............... | F16K 1/46 |
| | | | | | | 251/357 |
| 4,485,844 | A | * | 12/1984 | Vander Kaay | ............... | F16K 15/026 |
| | | | | | | 137/515.7 |
| 4,524,951 | A | * | 6/1985 | Green | ............... | F16K 11/0655 |
| | | | | | | 137/625.25 |
| 4,799,506 | A | * | 1/1989 | Taylor | ............... | F16K 17/06 |
| | | | | | | 137/469 |
| 4,889,151 | A | * | 12/1989 | Oten | ............... | F16K 17/08 |
| | | | | | | 137/71 |
| 5,224,511 | A | * | 7/1993 | Schnettler | ............... | F16F 9/10 |
| | | | | | | 137/514 |
| 5,255,712 | A | * | 10/1993 | Foster | ............... | F16K 15/18 |
| | | | | | | 137/522 |
| 5,400,823 | A | * | 3/1995 | Elmer | ............... | F16D 35/021 |
| | | | | | | 137/112 |
| 5,540,415 | A | * | 7/1996 | Yamamoto | ............... | F16K 1/10 |
| | | | | | | 251/118 |
| 5,699,829 | A | * | 12/1997 | Weiler, Jr. | ............... | F16K 31/48 |
| | | | | | | 137/383 |
| 6,105,609 | A | | 8/2000 | Polidan et al. | | |
| 6,601,604 | B1 | * | 8/2003 | Cooper | ............... | A62C 37/50 |
| | | | | | | 137/269 |
| 6,691,512 | B1 | * | 2/2004 | Kopel | ............... | F16D 31/02 |
| | | | | | | 60/468 |
| 6,964,280 | B1 | * | 11/2005 | Trimble | ............... | F16K 15/063 |
| | | | | | | 137/454.5 |
| 8,607,818 | B2 | * | 12/2013 | Monroe | ............... | F16K 17/0426 |
| | | | | | | 137/478 |
| 8,739,820 | B1 | * | 6/2014 | Theobald | ............... | F16K 17/06 |
| | | | | | | 137/524 |
| 10,337,630 | B2 | * | 7/2019 | Apadula | ............... | F16K 17/044 |
| 2002/0074046 | A1 | * | 6/2002 | Sudani | ............... | F15B 13/0442 |
| | | | | | | 137/625.65 |
| 2003/0089869 | A1 | | 5/2003 | Hall et al. | | |
| 2007/0062588 | A1 | * | 3/2007 | Golovatai-Schmidt | ............... | |
| | | | | | | F01L 1/34 |
| | | | | | | 137/625.26 |
| 2008/0308163 | A1 | * | 12/2008 | Larsen | ............... | F16K 11/044 |
| | | | | | | 137/625.48 |
| 2010/0084031 | A1 | * | 4/2010 | Hunnicutt | ............... | F15B 13/0402 |
| | | | | | | 137/625.66 |
| 2011/0315494 | A1 | * | 12/2011 | Marking | ............... | F16F 9/46 |
| | | | | | | 188/281 |
| 2012/0024407 | A1 | * | 2/2012 | Kormanik | ............... | F16K 11/0716 |
| | | | | | | 137/625.69 |
| 2012/0160346 | A1 | | 6/2012 | Shelcoviz et al. | | |
| 2012/0211686 | A1 | * | 8/2012 | Okamoto | ............... | F16K 31/0624 |
| | | | | | | 251/129.15 |
| 2015/0013801 | A1 | * | 1/2015 | Scherer | ............... | F16K 1/54 |
| | | | | | | 137/614.2 |

FOREIGN PATENT DOCUMENTS

| KR | 1020090017788 | 2/2009 |
|---|---|---|
| KR | 1020090060938 | 6/2009 |
| KR | 1020110073954 | 6/2011 |
| KR | 10-1216035 | 12/2012 |

* cited by examiner

CHECK VALVE HAVING REVERSE-DIRECTION FLUID SUPPLY FUNCTION

CROSS-REFERENCE TO RELATED APPLICATIONS

This application is a national phase application under 35 U.S.C. § 371 of International Application No. PCT/KR2017/000431, filed Jan. 12, 2017, which claims priority to and the benefit of Korean Patent Applications No. 10-2016-0004589, filed Jan. 14, 2016, No. 10-2016-0004588, filed Jan. 14, 2016, No. 10-2016-0021979, filed Feb. 24, 2016, and No. 10-2016-0021977, filed Feb. 24, 2016. The contents of the referenced patent applications are incorporated into the present application by reference.

FIELD OF THE DISCLOSURE

The present invention relates to a check valve having a reverse-direction fluid supply function, and more particularly, to a check valve having a reverse-direction fluid supply function capable of supplying a fluid in a reverse direction by arbitrarily opening a fluid passage formed on a central shaft of a disk which is configured to open or close a flow path through which a fluid is supplied as necessary.

DESCRIPTION OF RELATED ART

Generally, a valve is a device which controls a flow rate, a flow velocity, a pressure and the like of a fluid flowing in a pipe, and particularly, a check valve is used as a valve which allows a fluid to flow in one direction, but blocks the fluid from flowing in the reverse direction.

FIG. 1 is a schematic view illustrating a conventional check valve.

Referring to the drawing, a general check valve may be formed with an inlet hole 11 connected to an inlet pipe 50 through which a fluid is supplied, and a discharge hole 12 connected to a discharge pipe through which the fluid is discharged, and include a valve body 10 having a space portion 13 formed inside the valve body 10 and configured to communicate with the inlet hole 11 and the discharge hole 12, a stem 20 having one side positioned outside the valve body 10 and the other side positioned inside the valve body 10, a disk 30 connected to the other side of the stem 20 and configured to open or close the inlet hole 11 while linearly moving in both directions, and a spring 40 fitted between the disk 30 and the discharge hole 12 of the valve body 10 to provide an elastic reaction force to the disk 30.

Accordingly, when a fluid pressure is applied to the inlet hole 11, the spring 40 may contract, and the disk 30 may open the inlet hole 11 so that a fluid may be introduced into the space portion 13. On the other hand, when a fluid pressure is not applied to the inlet hole 11, the spring 40 expands due to an elastic reaction force thereof, and the disk 30 blocks the inlet hole 11 so that a fluid is not introduced through the inlet hole 11, and the fluid in the space portion 13 is not discharged through the inlet hole 11. (For reference, "fluid pressure" is a generic term for pressures of various kinds of fluids including a hydraulic pressure, a water pressure, or the like.)

However, since the conventional check valve has a structure in which, when a fluid pressure is applied to the inlet hole 11, the disk 30 is inevitably moved to open the inlet hole 11 due to the pressure, and a fluid is introduced through the inlet hole 11, there has been a problem in that a fluid is continuously introduced through the inlet hole 11 even in a situation in which the fluid should be blocked from being supplied to the space portion 13 and the discharge pipe.

In addition, in a case in which a fluid in the space portion 13 needs to be supplied to the inlet pipe 50, the fluid may not be supplied to the inlet pipe 50 because the inlet hole 11 is blocked by the disk 30, and a separate fluid passage being formed in the inlet pipe 50 in order to supply the fluid is cumbersome.

SUMMARY OF THE INVENTION

The present invention is directed to providing a check valve having a reverse-direction fluid supply function to solve the above-described problems.

The check valve having the reverse-direction fluid supply function is provided, wherein the check valve is capable of opening an inlet hole, through which a fluid is introduced, with a fluid pressure, forcibly blocking the inlet hole not to be open even when the fluid pressure is applied to the inlet hole, adjusting an opening extent of the inlet hole even when the inlet hole is opened due to the fluid pressure, and resupplying the fluid introduced into the check valve from the inlet pipe to the inlet pipe as necessary.

Objectives to be achieved by embodiments of the present invention are not limited to the above-described objectives, and other objectives which are not described above may be clearly understood by those skilled in the art through the following specification.

One aspect of the present invention provides a check valve having a reverse-direction fluid supply function, wherein the check valve includes: a valve main body into which a fluid is introduced; a shaft installed in the valve main body and configured to move forward toward an inside of the valve main body or backward toward an outside of the valve main body; a disk disposed in the valve main body and configured to open or close the valve main body; and a spring interposed between the disk and an inner surface of the valve main body, wherein, in a case in which a fluid pressure of the fluid is applied to the disk, the disk opens the valve main body due to the fluid pressure of the fluid or blocks the valve main body due to movement of the shaft, and in a case in which the fluid pressure of the fluid is removed, the disk blocks the valve main body due to an elastic reaction force of the spring.

The valve main body may include a body portion in which an inlet hole connected to an inlet pipe providing a flow path is formed at one side of the body portion, an exit hole is formed at the other side, and a discharge hole is formed in a direction perpendicular to a direction from the inlet hole to the exit hole, and a cap portion which blocks the exit hole.

The valve main body may further include a nut member which is hollow, which is disposed to pass through a center of the cap portion, and which includes a thread formed on an inner circumferential surface of the nut member, and the shaft may include a thread formed on an outer circumferential surface of the shaft and may be fitted to the nut member.

An end portion of the inlet pipe may pass through the inlet hole and be positioned in the valve main body, and the disk may open or close the end portion of the inlet pipe.

A strainer configured to filter out a foreign material from the fluid may be formed between the inlet hole and the discharge hole in the valve main body.

The disk may include: a disk member including a hollow at a central portion of the disk and formed of a metal material; and a cover member formed of an elastic material and formed to cover an outer portion of the disk member.

A groove in which an outer diameter of the shaft decreases may be formed in one section of the shaft positioned in the inlet pipe, and a fluid passage to which the shaft is fitted may be formed in a central portion of the disk.

A guide member configured to support one end of the shaft may be formed in the inlet pipe.

A stopper which protrudes in a circumferential direction of the shaft to press the disk toward the inlet hole or the opening of the inlet pipe may be formed on an outer circumferential surface of the shaft.

The groove may include a pair of inclined sections in which outer diameters symmetrically decrease and a horizontal section in which an outer diameter is constantly maintained between the inclined sections.

A sealing member which is formed of an elastic material and which protrudes toward a center of the fluid passage in a circumferential direction of the fluid passage may be formed in the fluid passage in the disk.

The sealing member may be formed at each of both sides of the fluid passage.

The check valve may further include a central shaft inserted into a hollow formed in the shaft, wherein, in the central shaft, a fluid passage may be formed at an inside, an outlet hole which communicates with the fluid passage may be formed at one side, an inlet hole which communicates with the fluid passage may be formed at the other side, and the other side may be fitted to the hollow such that the inlet hole is movable to or from the hollow, wherein the disk may be integrally fixed to the central shaft.

A sealing member which is formed of an elastic material and which protrudes toward a center of the hollow in a circumferential direction of the hollow is formed on an inner surface of the hollow of the shaft.

The fluid passage may include: a vertical portion which communicates with the outlet hole and which is formed in parallel to a longitudinal direction of the central shaft; and a horizontal portion in which one side of the horizontal portion communicates with the inlet hole, in which the other side thereof communicates with the vertical portion, and which is formed in parallel to a diameter direction of the central shaft.

According to embodiments of the present invention, a check valve having a reverse-direction fluid supply function has effects in that an inlet hole through which a fluid is introduced can be opened due to a fluid pressure, the inlet hole can be forcibly blocked even when the fluid pressure is applied to the inlet hole, an opening extent of the inlet hole can be adjusted even when the inlet hole is opened due to the fluid pressure, and the fluid introduced into the check valve from the inlet pipe can be resupplied to the inlet pipe as necessary.

In addition, although a shaft is rotated by a handle, since all of an operation in which the inlet hole through which a fluid is introduced can be opened due to a fluid pressure due to a rotating direction or rotating degree of the shaft, an operation in which the inlet hole can be forcibly blocked instead of being opened even when the fluid pressure is applied, an operation in which an opening extent of the inlet hole can be adjusted even when the inlet hole is opened due to the fluid pressure, and an operation in which the fluid introduced into the check valve through the inlet pipe can be resupplied to the inlet pipe as necessary can be controlled, there are effects in that a manipulation is simple, and a structure of the check valve is simple.

Effects of the present invention are not limited to the above-described effects, and effectives which are not described above will be clear to those skilled in the art from a following specification.

DETAILED DESCRIPTION OF THE INVENTION

Figure 1:
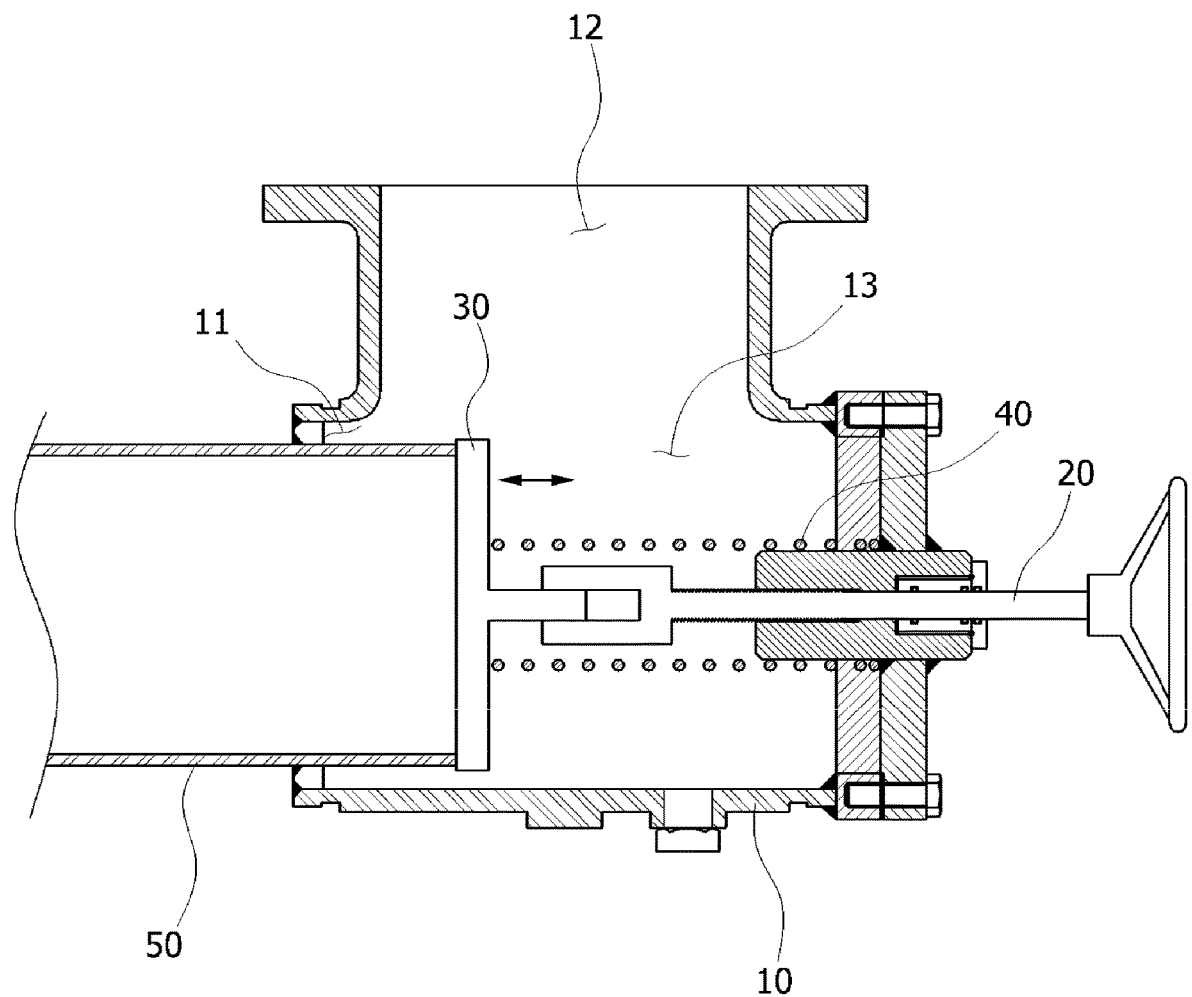
FIG. 1 is a schematic view illustrating a conventional check valve.

Hereinafter, the exemplary embodiments of the present invention will be described in detail with reference to the accompanying drawings. The same or similar elements will be consistently denoted by the same reference numerals and described in detail no more than once regardless of drawing symbols.

In addition, in descriptions of the invention, when detailed descriptions of related well-known technology are deemed to unnecessarily obscure the gist of the invention, they will be omitted. In addition, the accompanying drawings are only provided so that the embodiments disclosed in the specification are easily understood, and a technical concept of the present invention is not limited thereto, but it will be understood that the invention is to cover all modifications, equivalents, and alternatives falling within the spirit and scope of the invention.

Figure 2:
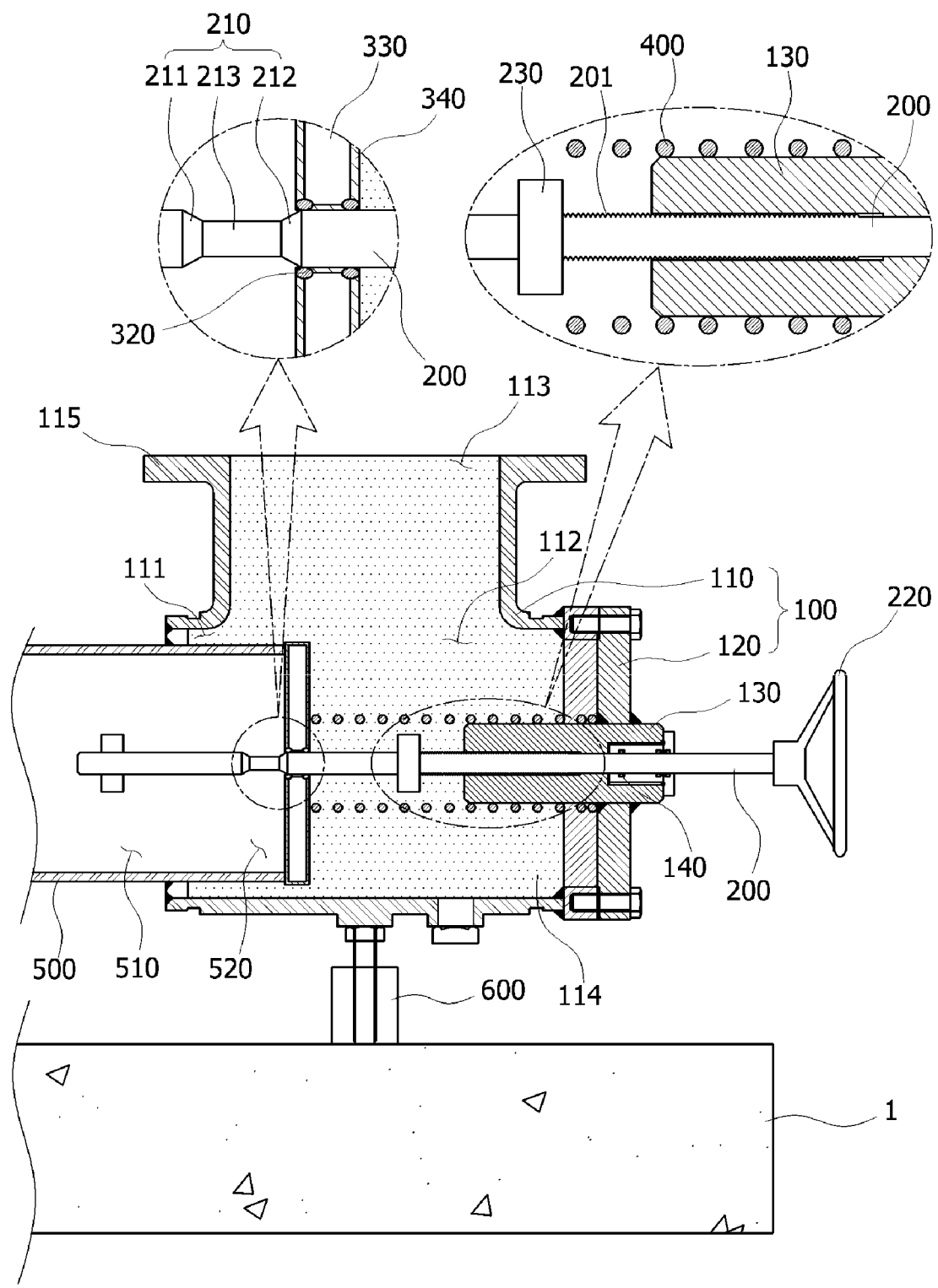
FIG. 2 is a cross-sectional view illustrating a state in which a check valve having a reverse-direction fluid supply function according to a first embodiment of the present invention is blocked.
Figure 3:
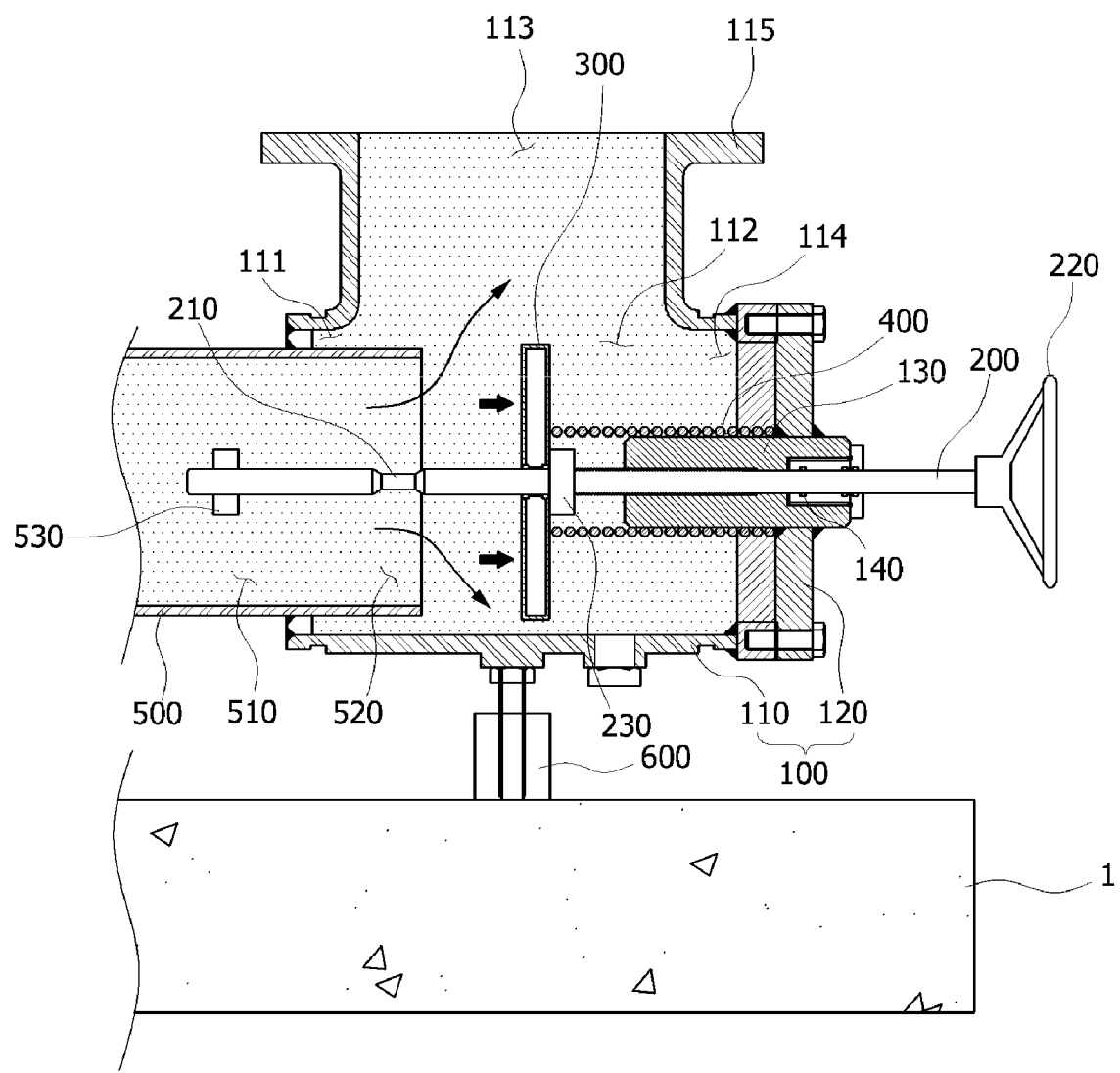
FIG. 3 is a cross-sectional view illustrating a state in which the check valve having the reverse-direction fluid supply function according to the first embodiment of the present invention is opened.

FIG. 2 is a cross-sectional view illustrating a state in which a check valve having a reverse-direction fluid supply function according to a first embodiment of the present invention is blocked, and FIG. 3 is a cross-sectional view illustrating a state in which the check valve having the reverse-direction fluid supply function according to the first embodiment of the present invention is opened.

Hereinafter, "fluid pressure" mentioned in the description is a generic term for pressures of various kinds of fluids including a hydraulic pressure, a water pressure, or the like.

Referring to FIGS. 2 and 3, the check valve having the reverse direction fluid supply function according to the first embodiment of the present invention includes a valve main body 100, a shaft 200, a disk 300, and a spring 400.

First, an inlet hole 111 connected to an inlet pipe 500 forming a flow path 510 through which a fluid is transferred, a space portion 112 in which the fluid supplied to an inside of the valve main body 100 through the inlet pipe 500 stays, and a discharge hole 113 through which the fluid supplied to the space portion 112 is discharged to the outside are formed in the valve main body 100.

The valve main body 100 may serve as a housing for the valve, may be formed in a bar shape in which the inlet hole 111 faces the discharge hole 113, or in a 'T' or 'L' shape in which the inlet hole 111 is disposed to be perpendicular to the discharge hole 113, and may also be formed to have various types. In addition, flanges 115 may be formed on outer circumferential surfaces of the inlet hole 111 or the discharge hole 113.

For reference, the inlet hole 111 is connected to the inlet pipe 500, and the discharge hole 113 is connected to a discharge pipe. The flanges 115 may be formed at portions at which the inlet hole 111 and the discharge hole 113 are in contact with the inlet pipe 500 and the discharge pipe, respectively, and the inlet hole 111 and the discharge hole 113 may be respectively connected to the inlet pipe 500 and the discharge pipe by bolts. In addition, protrusions or grooves may also be formed at end portions at which the inlet hole 111 and the discharge hole 113 are in contact with the inlet pipe 500 and the discharge pipe, respectively, and the inlet hole 111 and the discharge hole 113 may be respectively connected to the inlet pipe 500 and the discharge pipe by coupling units such as a ring joint, a groove joint, or the like. In addition, the inlet pipe 500 and the discharge pipe may be fitted to the inlet hole 111 and the discharge hole 113, respectively, and the inlet hole 111 and the discharge hole 113 may also be connected to the inlet pipe 500 and the discharge pipe through welding processes.

The valve main body 100 may be installed on a bottom surface 1, and a height control unit 600 for adjusting a distance between the bottom surface 1 and the valve main body 100 may be separately formed outside the valve main body 100.

In addition, an emergency exit port which may discharge a fluid contained in the valve main body 100 to the outside or through which a fluid may be supplied from the outside in an emergency may be formed in the valve main body 100. The emergency exit port may be normally blocked by a cap to be opened in an emergency.

One end of the shaft 200 is positioned inside the inlet pipe 500, and the other end is positioned outside the valve main body 100 and connected to a handle 220, and a groove 210 in which an outer diameter decreases is formed at one section of the shaft 200 positioned inside the inlet pipe 500.

As described above, one end portion of the shaft 200 is positioned inside the inlet pipe 500 and the other end portion passes through the valve main body 100 and is positioned outside the valve main body 100. The handle 220 for rotating the shaft 200 is installed at an end portion of the shaft 200 which is positioned outside the valve main body 100.

Since the handle 220 is disposed outside the valve main body 100, an operator may manipulate the handle 220 from an outside of the valve main body 100. As an example, when the handle 220 is rotated in the clockwise (or counterclockwise) direction, the shaft 200 may move forward toward an inside of the valve main body 100, and when the handle 220 is rotated in the counterclockwise (or clockwise) direction, the shaft 200 may move backward toward the outside of the valve main body 100.

The groove 210, at which the outer diameter of the shaft 200 decreases, is formed at the one section of the shaft 200 positioned inside the inlet pipe 500. The groove 210 may have a shape in which a groove, which is inwardly concave, extends in a circumferential direction.

Since the groove 210 should be specifically described with the disk 300, the groove 210 will be described below.

A fluid passage into which the shaft 200 is fitted is formed at a central portion of the disk 300, and the disk 300 opens or closes the inlet hole 111 or the opening 520 of the inlet pipe 500 while being fitted to the shaft 200 and moved in the both directions.

The disk 300 may be formed as a circular plate and use the shaft 200 as a guide to move toward the inlet hole 111 or the opening 520 of inlet pipe 500 to block the inlet hole 111 or the opening 520 of inlet pipe 500, or to move toward the handle 220 to open the inlet hole 111 or the opening 520 of inlet pipe 500. When the inlet hole 111 or the opening 520 of inlet pipe 500 is opened, a fluid transferred to the inlet pipe 500 may be introduced into the valve main body 100, and when the inlet hole 111 or the opening 520 of inlet pipe 500 is blocked, a fluid transferred to the inlet pipe 500 is not introduced into the valve main body 100, and the fluid in the main body 100 is not discharged to the inlet pipe 500.

In addition, an end portion of the inlet pipe 500 may pass through the inlet hole 111 and be positioned inside the valve main body 100, and the disk 300 may open or close the end portion of the inlet pipe 500.

In the above-described embodiment, although it has been clearly described that the disk 300 may open or close the inlet hole 111 or the opening 520 of inlet pipe 500, in a case in which the end portion of the inlet pipe 500 passes through the inlet hole 111 and is positioned inside the valve main body 100, the disk 300 may open or close the opening 520 formed at the end portion of the inlet pipe 500.

A compression spring may be provided as the spring 400 which is disposed between the disk 300 and an inner surface of the valve main body 100 and supplies an elastic reaction force to the disk 300. More specifically, the spring 400 provides a pressing force which pushes the disk 300 toward the inlet hole 111 or the opening 520 of inlet pipe 500. Here, the shaft 200 is disposed to pass through an inside of the spring 400.

In the check valve configured as described above, the inlet hole 111 or the opening 520 of inlet pipe 500 may be blocked by the disk 300 due to a pressing force of the spring 400. In addition, while the spring 400 is contracted due to a pressure of a fluid supplied to the inlet pipe 500, the disk 300 may move toward the handle 220, and the inlet hole 111 or the opening 520 of inlet pipe 500 may also be opened.

As illustrated in FIG. 2, in a case in which a fluid is not transferred to the inlet pipe 500 or an amount of fluid is small, since a fluid pressure, which pushes the disk 300 having blocked the opening 520 of the inlet pipe 500 due to a pressing force of the spring 400 toward the handle 220, is not generated, the disk 300 may continuously block the opening 520 of the inlet pipe 500. In addition, in a state in which a fluid fills the valve main body 100, a state in which the disk 300 blocks the opening 520 of the inlet pipe 500 is inevitably maintained due to a pressure of the fluid.

On the other hand, as illustrated in FIG. 3, when a fluid is supplied to the inlet pipe 500 and a fluid pressure applied from the inlet pipe 500 is greater than a pressing force of the spring 400, the spring 400 may be contracted due to the fluid pressure, the disk 300 having blocked the opening 520 of the inlet pipe 500 may move toward the handle 220, the opening 520 of the inlet pipe 500 may be opened, and a fluid transferred to the inlet pipe 500 may be introduced into the valve main body 100.

Figure 5:
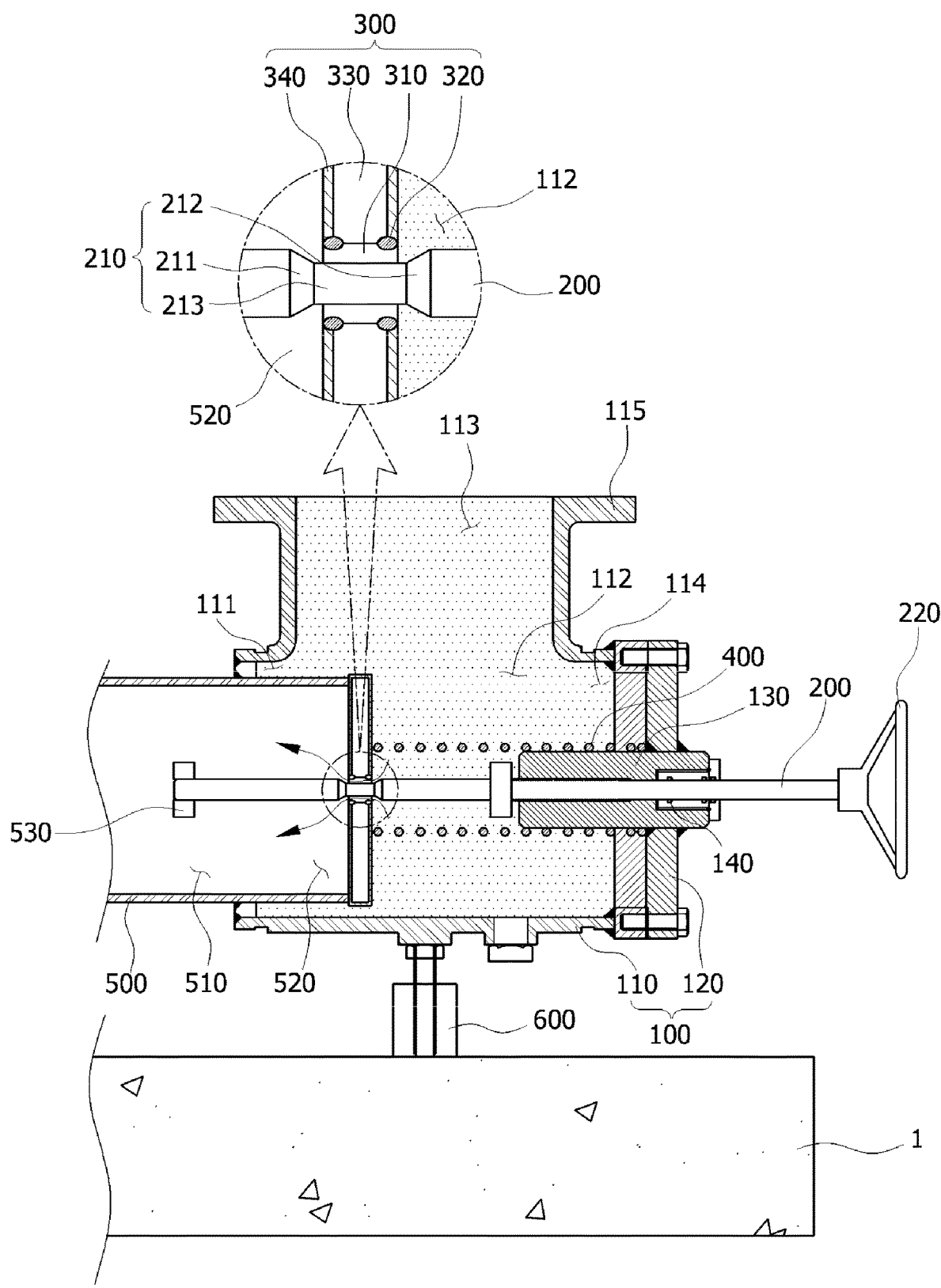
FIG. 5 is a cross-sectional view illustrating a state in which a fluid passage of the check valve having the reverse-direction fluid supply function according to the first embodiment of the present invention is opened and a fluid is supplied in a reverse direction.

FIG. 5 is a cross-sectional view illustrating a state in which a fluid passage of the check valve having the reverse-direction fluid supply function according to the first embodiment of the present invention is opened and a fluid is supplied in a reverse direction.

Although the outer diameter of the shaft 200 is preferably the same as a diameter of the fluid passage 310 formed in the disk 300, the outer diameter of the shaft 200 may be slightly smaller than a diameter of the disk 300 so that the disk 300 fitted to the shaft 200 moves smoothly. However, an outer diameter of the groove 210 should be definitely smaller than the diameter of the fluid passage 310 of the disk 300. This is to secure a space through which a fluid is discharged between the groove 210 and the fluid passage 310 when the groove 210 is positioned in the fluid passage 310 of the disk 300.

That is, in a state in which the disk 300 blocks the opening 520 of the inlet pipe 500, in a case in which a fluid which fills the valve main body 100 needs to be resupplied to the inlet pipe 500, when the shaft 200 is moved backward toward the handle 220 by rotating the handle 220 in one direction, the groove 210 is positioned in the fluid passage 310, and the fluid which fills the valve main body 100 may be resupplied to the inlet pipe 500 through the space between the groove 210 and the fluid passage 310.

Next, when a necessary amount of fluid is resupplied to the inlet pipe 500, the groove 210 is adjusted to move to an outside of the fluid passage 310 by rotating the handle 220 in the other direction. When the groove 210 is moved to the outside of the fluid passage 310, the fluid passage 310 is blocked by the shaft 200 again, and the fluid is not discharged through the fluid passage 310.

In addition, the groove 210 may include a pair of inclined sections 211 and 212 having outer diameters which symmetrically decrease gradually and a horizontal section 213 having an outer diameter which is constantly maintained between the inclined sections 211 and 212.

In a case in which the inclined sections 211 and 212 are not formed at the groove 210, since a step portion formed at a boundary of the groove 210 may be hooked on an edge of the fluid passage 310 while the groove 210 positioned in the fluid passage 310 is moved to the outside of the fluid passage 310, forward or backward movement of the shaft 200 may be obstructed.

However, when the inclined sections 211 and 212 are formed on the groove 210 as described above, an in-out operation, in which the groove 210 enters the fluid passage 310 or the groove 210 positioned in the fluid passage 310 is moved to the outside of the fluid passage 310, may be performed smoothly along the inclined sections 211 and 212.

In addition, the inlet hole 111 is formed at one side of the valve main body 100, an exit hole 114 is formed at the other side facing the inlet hole 111, the discharge hole 113 is formed in a direction perpendicular to a direction from the inlet hole 111 to the exit hole 114, and the valve main body 100 may include a body portion 110 having a 'T' shape and forming a space portion 112 communicating with the inlet hole 111, the exit hole 114, and the discharge hole 113 at an inside thereof, and a cap portion 120 which blocks the exit hole 114 of the body portion 110.

Here, the spring 400 is fitted between the disk 300 and an inner surface of the cap portion 120 which is disposed to face the disk 300.

Accordingly, when the handle 220 is rotated in a position facing the inlet pipe 500, the shaft 200 may be moved forward or backward, and the disk 300 may move in both directions in parallel to the shaft 200 to open or close the inlet hole 111 or the opening 520 of the inlet pipe 500.

When the opening 520 of the inlet pipe 500 is opened, a fluid in the inlet pipe 500 may pass through the valve main body 100, be discharged through the discharge hole 113 disposed perpendicularly above or below the opening 520, and be supplied to the discharge pipe.

In addition, the valve main body 100 may further include a nut member 130 which is hollow, which is disposed to pass through a center of the cap portion 120, and which includes a thread 131 formed on an inner circumferential surface thereof, and the shaft 200 includes a thread 201 formed on an outer circumferential surface thereof, is fitted to the nut member 130, and rotates to linearly move in the both directions.

Here, one end of the nut member 130 may be positioned inside the valve main body 100, and the other end may be positioned outside the valve main body 100, and the nut member 130 and the cap portion 120 may be connected through a welding method and the like. In addition, a sealing member 140 for blocking a fluid flow may be formed between the nut member 130 and the shaft 200.

Accordingly, when the handle 220 positioned outside the valve main body 100 is rotated, the shaft 200 inserted into the nut member 130 may be moved forward or backward. Here, since the nut member 130 is fixed to the cap portion 120, the nut member 130 is not rotated, and only the shaft 200 is rotated to move forward or backward according to a rotating direction of the shaft 200.

In addition, a guide member 530 which is hollow and supports the one end of the shaft 200 may be provided inside the inlet pipe 500. The shaft 200 moves forward or backward in a state in which the shaft 200 passes through and is fitted to the hollow guide member 530. Accordingly, both ends of the shaft 200 are supported by the guide member 530 and the valve main body 100 so that the shaft 200 may not be inclined in one direction and may maintain a horizontal state.

Figure 4:
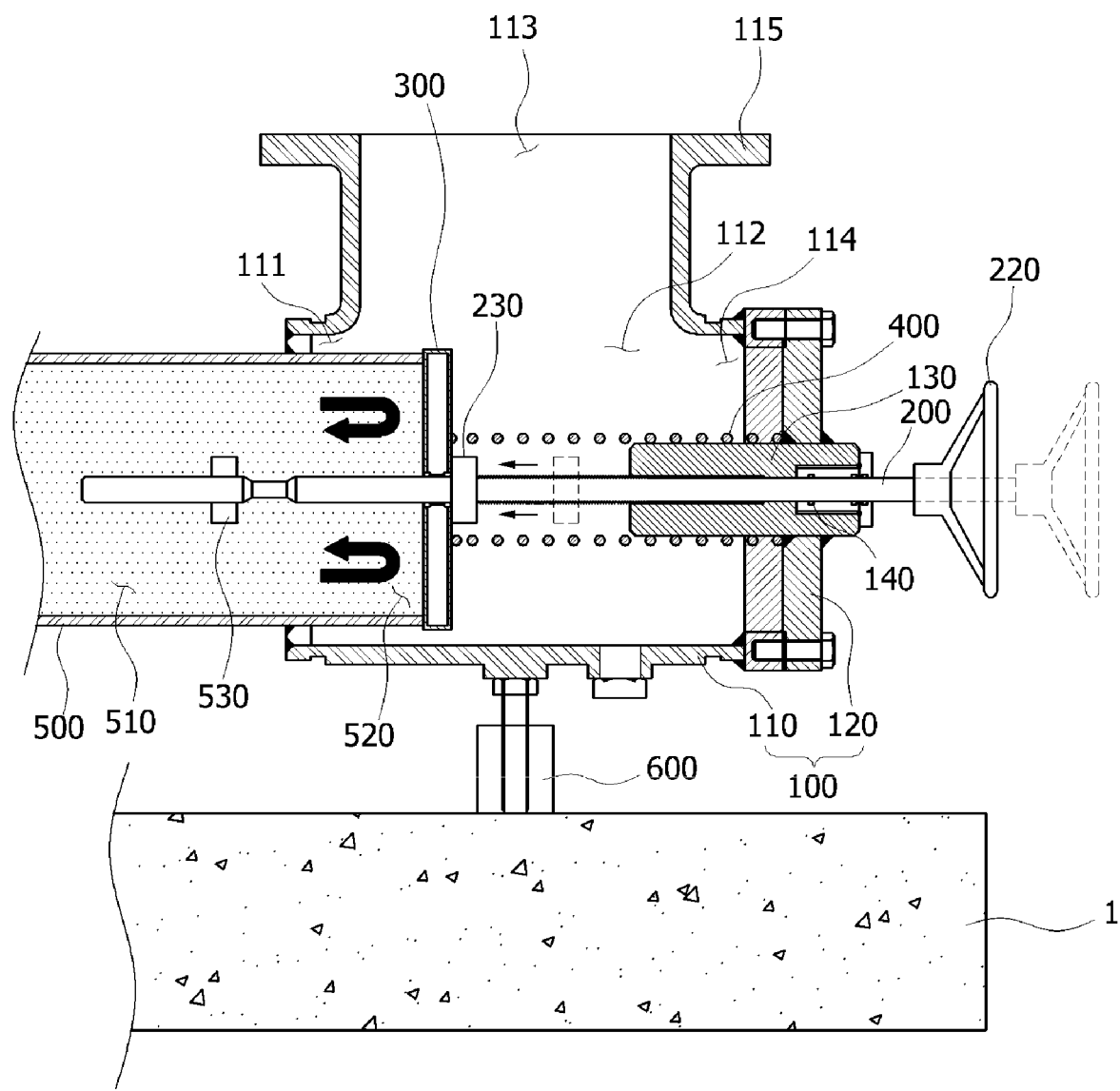
FIG. 4 is a cross-sectional view illustrating a state in which the check valve having the reverse-direction fluid supply function according to the first embodiment of the present invention is forcibly blocked.

FIG. 4 is a cross-sectional view illustrating a state in which the check valve having the reverse-direction fluid supply function according to the first embodiment of the present invention is forcibly blocked.

Referring to FIG. 4, a stopper 230 which protrudes in the circumferential direction to press the disk 300 toward the inlet hole 111 or the opening 520 of inlet pipe 500 may be formed at an outer circumferential surface of the shaft 200.

The stopper 230 is fixed to the shaft 200, rotates with the shaft 200, moves in the both directions along the shaft 200, and provides a pressing force which presses the disk 300 against the inlet hole 111 or the opening 520 of inlet pipe 500 so that the disk 300 forcibly blocks the inlet hole 111 or the opening 520 of inlet pipe 500.

That is, when the stopper 230 is positioned to be in contact with the disk 300 and the disk 300 is pressed by rotating the shaft 200, the disk 300 may be fixedly pressed against the inlet hole 111 or the opening 520 of inlet pipe 500. Here, even when a fluid is transferred to the inlet pipe 500 and a fluid pressure is applied to the disk 300, since the stopper 230 forcibly pushes the disk 300, the disk 300 may not move, and a state in which the inlet hole 111 or the opening 520 of inlet pipe 500 is blocked may be maintained.

In addition, an extent of opening performed by the disk 300 and a flow rate of a fluid introduced into the valve main body 100 may be adjusted by the stopper 230. Since the stopper 230 rotates with the shaft 200 and moves in the both directions along the shaft 200, a gap between the stopper 230 and the disk 300 may be adjusted. Accordingly, when the gap between the stopper 230 and the disk 300 decreases, a moving distance of the disk 300 is inevitably restricted to a short distance, and when a fluid is transferred to the inlet pipe 500 and a fluid pressure is applied to the disk 300, opening may be performed by the disk 300 to a restricted distance, and thus a flow rate of the fluid introduced into the valve main body 100 may be adjusted.

On the other hand, when the gap between the stopper 230 and the disk 300 increases, the moving distance of the disk 300 inevitably increases, and when a fluid is transferred to the inlet pipe 500 and a fluid pressure is applied to the disk 300, opening may be performed by the disk 300 to an increased distance, and thus a flow rate of the fluid introduced into the valve main body 100 may be increased relatively.

In addition, a sealing member 320 which is formed of an elastic material and protrudes toward a central portion in the circumferential direction of the fluid passage 310 may be formed on the disk 300. The sealing member 320 is formed of a rubber material or the like to block a gap between the passage 310 and the shaft 200 so that a fluid is not discharged through the gap. Here, an inner diameter of the sealing member 320 may be greater than the outer diameter of the groove 210.

As an example, when the shaft 200 is positioned in the fluid passage 310, the gap between the fluid passage 310 and the shaft 200 may be perfectly blocked by the sealing member 320 so that a fluid flow may be blocked. On the other hand, since the inner diameter of the sealing member 320 is greater than the outer diameter of the groove 210, when the groove 210 is positioned in the fluid passage 310, a gap may be generated between the fluid passage 310 and the sealing member 320 and the groove 210 so that a fluid may discharged through the gap.

In addition, the disk 300 may include a disk member 330 having a hollow central portion and formed of a metal material, and a cover member 340 formed of an elastic material and formed to cover an outer portion of the disk member 330, and the sealing member 320 may be integrally formed with the cover member 340.

The disk member 330 is for reinforcing the disk 300 and is formed of a metal material. The cover member 340 is formed of an elastic material such as rubber and the like and configured to cover an outer side of the disk member 330. The disk member 330 and the cover member 340 may be integrally formed through an insert-injection method. The hollow of the disk member 330 may serve as the fluid passage 310, the cover member 340 formed at an outer side of the hollow may be formed by extending a protrusion protruding toward a center of the hollow in the circumferential direction, and the protrusion may serve as the sealing member 320.

In addition, the sealing member 320 may be formed at each of both sides of the fluid passage 310. Accordingly, even when a gap is generated between any one of the sealing members 320 and the shaft 200 while the shaft 200 is inclined to one side in a state in which the shaft 200 is fitted to the fluid passage 310, a gap between the fluid passage 310 and the shaft 200 may be stably blocked by another sealing member 320.

Figure 6:
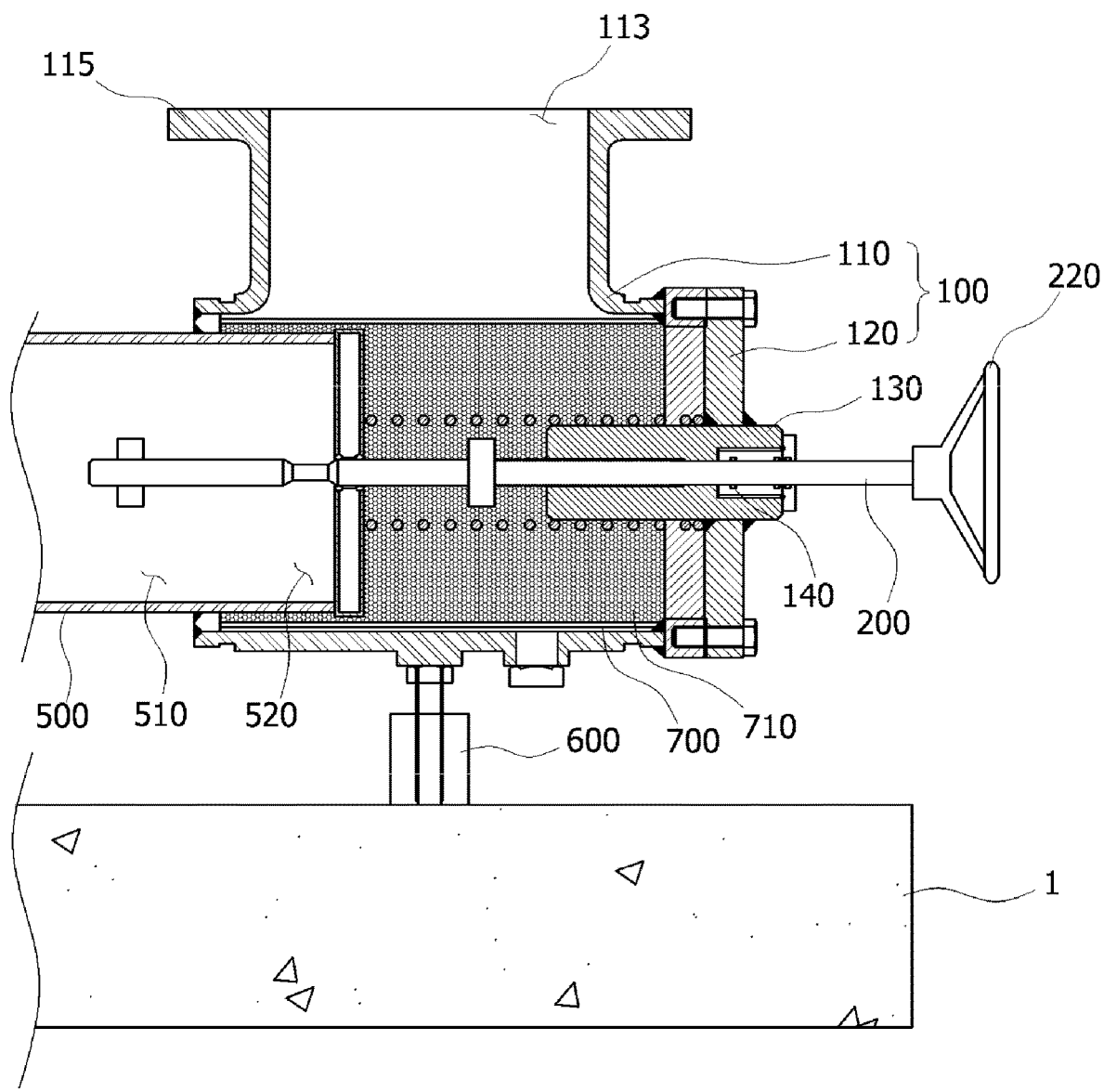
FIG. 6 is a cross-sectional view illustrating a check valve having a reverse-direction fluid supply function according to a second embodiment of the present invention.

FIG. 6 is a cross-sectional view illustrating a check valve having a reverse-direction fluid supply function according to a second embodiment of the present invention.

Referring to FIG. 6, a strainer 700 for filtering out foreign materials from a fluid introduced through an inlet hole 111 and discharged through a discharge hole 113 may be formed between the inlet hole 111 and the discharge hole 113 of a valve main body 100.

As an example, a mesh including a plurality of filter holes may be provided as the strainer and may be formed at the inlet hole 111, the discharge hole 113, or an opening 520 of an inlet pipe 500.

As another example, the strainer 700 may be formed in a hollow pipe shape and include a plurality of filter holes 710 formed on a side surface thereof. In addition, the strainer 700 may be disposed in parallel to a shaft 200, and the shaft 200 and a disk 300 may be accommodated inside the strainer 700, and the opening 520 of the inlet pipe 500 may also be positioned inside the strainer 700. Accordingly, foreign materials contained in a fluid introduced through the opening 520 of the inlet pipe 500 may be filtered out by the strainer 700, and the fluid may be discharged through the discharge hole 113.

Figure 7:
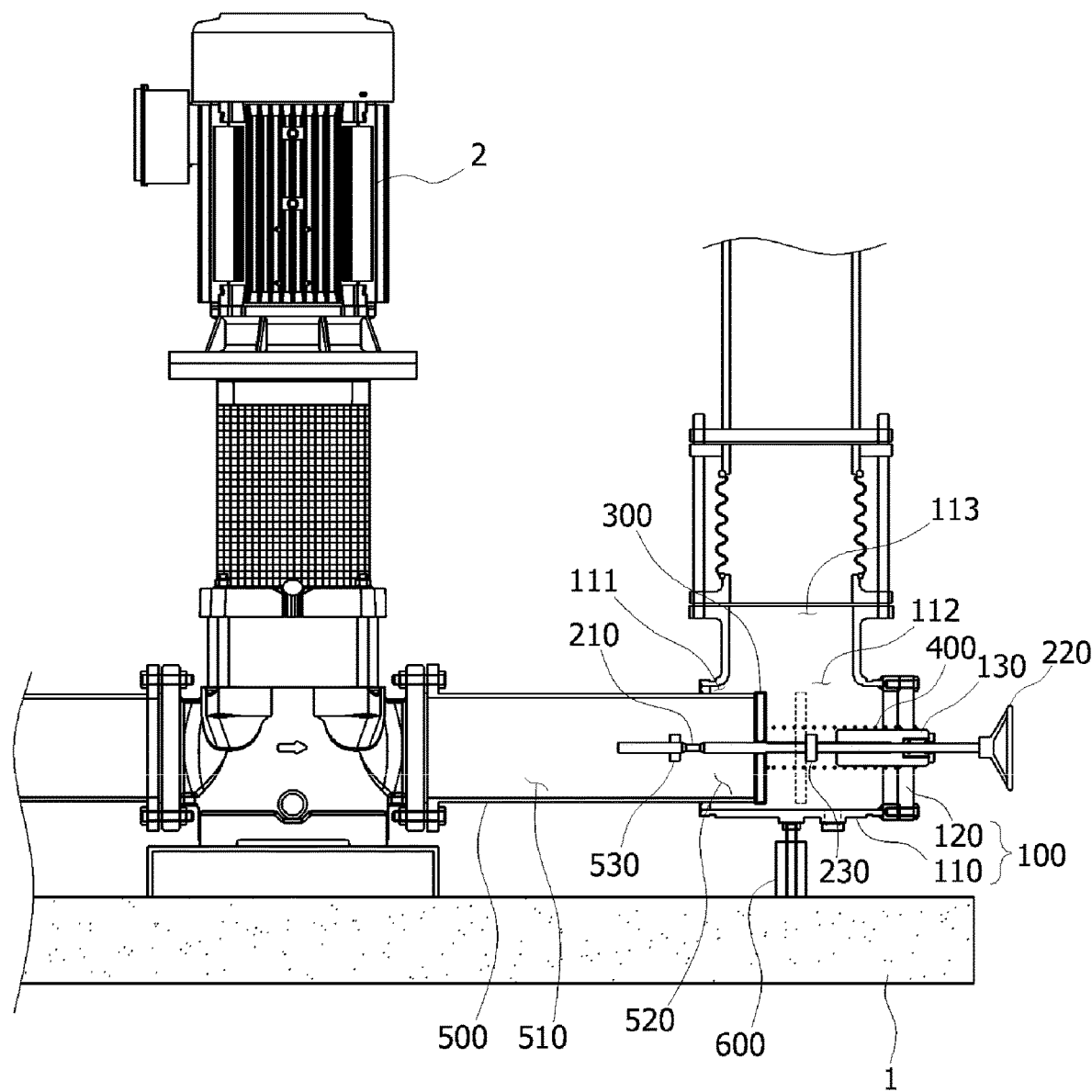
FIG. 7 is a cross-sectional view illustrating a fluid supply system in which the check valve having the reverse-direction fluid supply function according to the first embodiment of the present invention is installed.

FIG. 7 is a cross-sectional view illustrating a fluid supply system in which the check valve having the reverse-direction fluid supply function according to the first embodiment of the present invention is installed.

An operation of the check valve having the reverse-direction fluid supply function and the above-described structure will be described below according to a situation.

First, when a pump 2 is driven to transfer a fluid to the inlet pipe 500, while the disk 300 having blocked the opening 520 of the inlet pipe 500 due to a pressure of the fluid transferred to the inlet pipe 500 is pushed toward an inside of the valve main body 100, the fluid in the inlet pipe 500 is introduced into the valve main body 100. Next, when the driving of the pump 2 is stopped and the fluid is not transferred to the inlet pipe 500, a fluid pressure applied to the disk 300 is removed, and the disk 300 blocks the opening 520 of the inlet pipe 500 due to an elastic restoring force of the spring 400.

Meanwhile, in a case in which a fluid in the valve main body 100 is resupplied to the inlet pipe 500 to drive the pump 2 in a situation in which the disk 300 blocks the opening 520 of the inlet pipe 500, the groove 210 may be positioned in the fluid passage 310 of the disk 300 by rotating the handle 220 in a normal direction and the fluid in the main body 100 may be resupplied to the inlet pipe 500 through a gap between the groove 210 and the fluid passage 310. Next, when the fluid is completely supplied to the inlet pipe 500, the groove 210 is pulled out of the fluid passage 310 and the fluid passage 310 is blocked by the shaft 200 by rotating the handle 220 in the reverse direction so that the fluid is not discharged through the fluid passage 310 anymore.

In addition, in a case in which the opening 520 of the inlet pipe 500 needs to be forcibly blocked, the stopper 230 is pressed against the disk 300 by rotating the handle 220. When the stopper 230 is pressed against the disk 300, since the disk 300 is supported by the stopper 230 even when a fluid is transferred through the inlet pipe 500 and a fluid pressure is applied to the disk 300, the disk 300 may not open, and thus the opening 520 of the inlet pipe 500 may be forcibly blocked.

In addition, in a case in which a flow rate introduced into the valve main body 100 needs to be adjusted, a distance between the disk 300 and the stopper 230 is adjusted to a desired distance by rotating the handle 220. When the distance between the disk 300 and the stopper 230 is adjusted, since an extent of opening performed by the disk 300 is adjusted, the flow rate of a fluid introduced into the valve main body 100 from the inlet pipe 500 may be adjusted.

Figure 8:
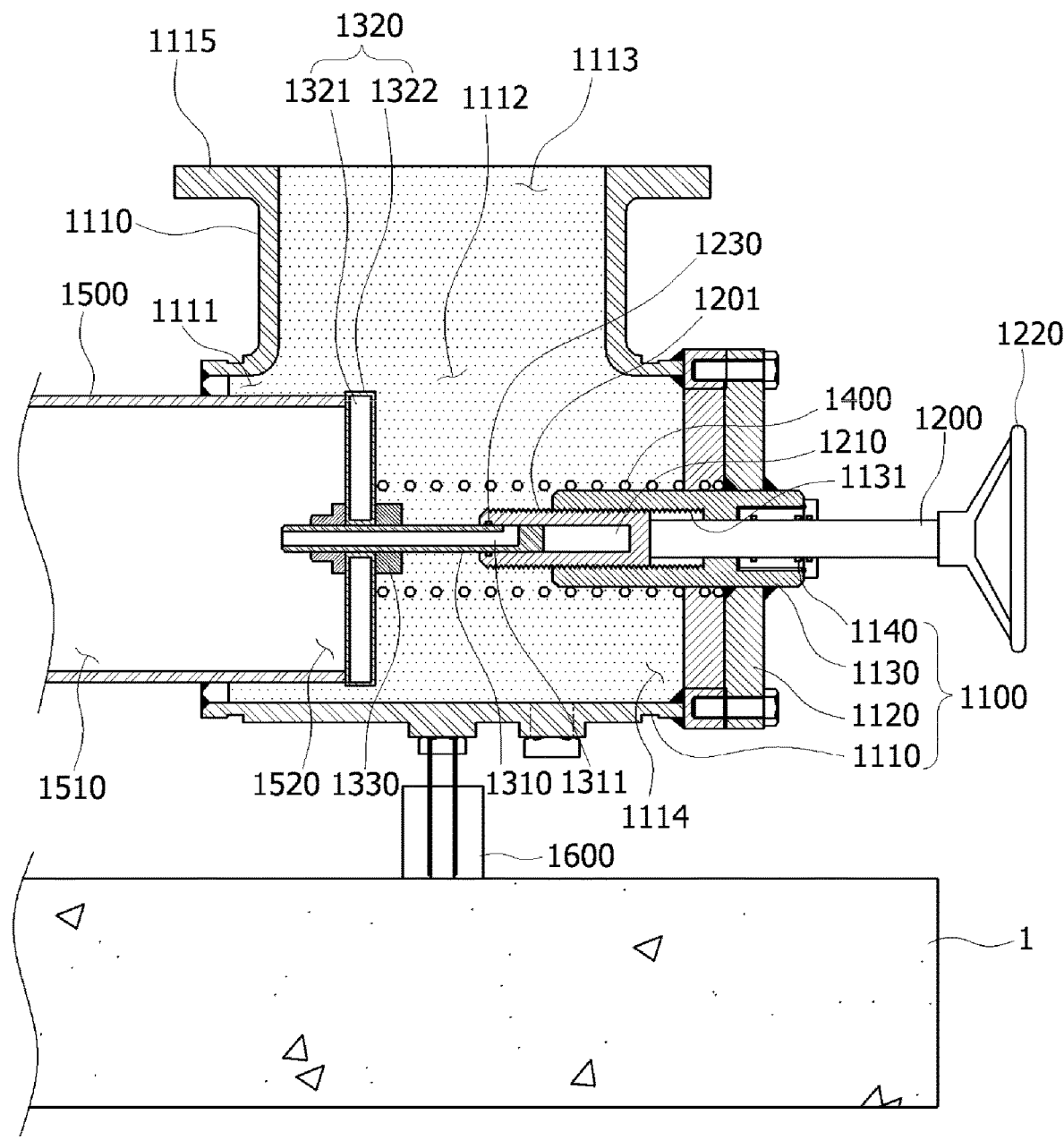
FIG. 8 is a cross-sectional view illustrating a state in which a check valve having a reverse-direction fluid supply function according to a third embodiment of the present invention is blocked.
Figure 9:
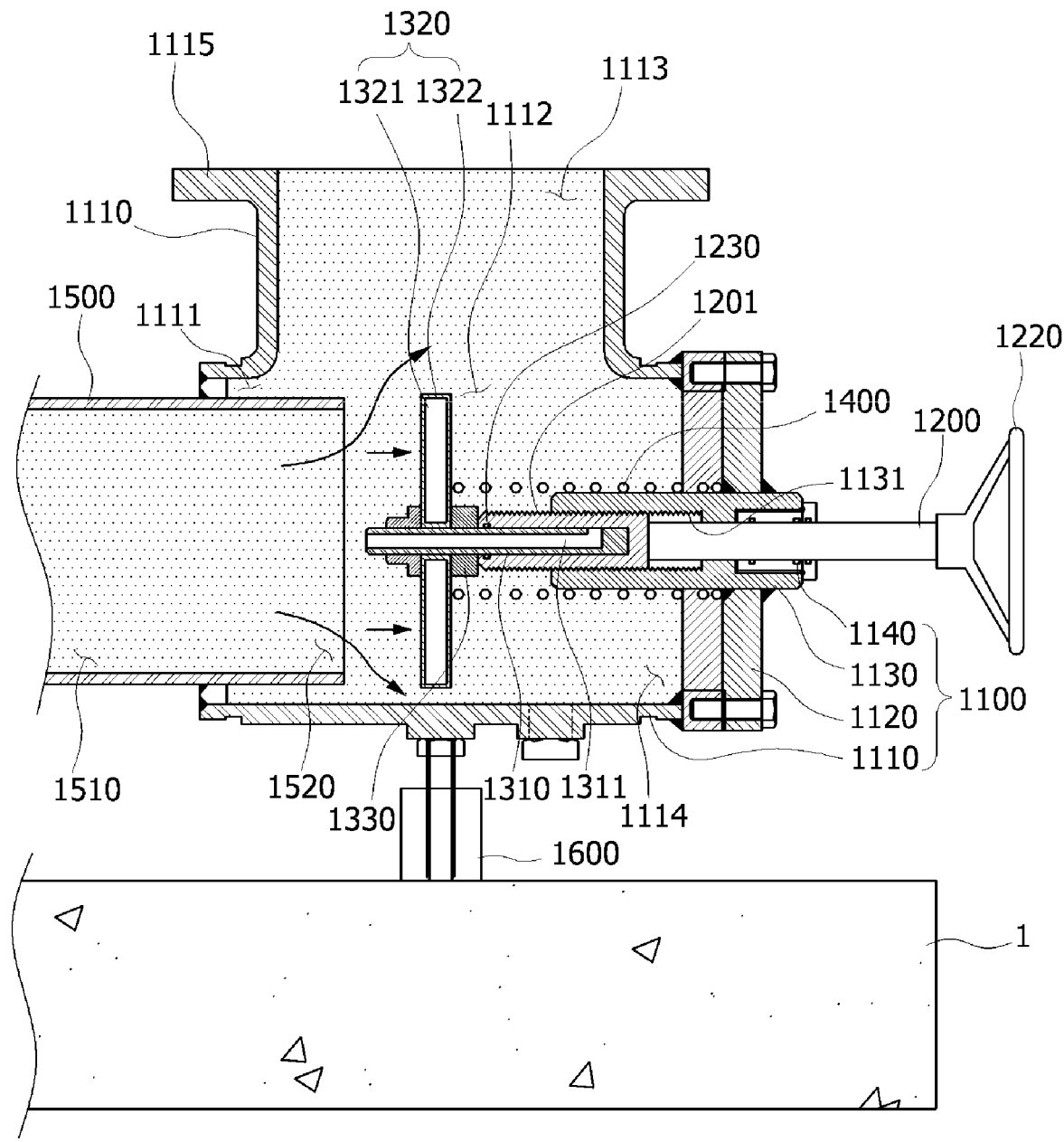
FIG. 9 is a cross-sectional view illustrating a state in which the check valve having the reverse-direction fluid supply function according to the third embodiment of the present invention is opened.

FIG. 8 is a cross-sectional view illustrating a state in which a check valve having a reverse-direction fluid supply function according to a third embodiment of the present invention is blocked, and FIG. 9 is a cross-sectional view illustrating a state in which the check valve having the reverse-direction fluid supply function according to the third embodiment of the present invention is opened.

Referring to FIGS. 8 to 9, a check valve having a reverse direction fluid supply function according to the third embodiment of the present invention includes a valve main body 1100, a shaft 1200, a central shaft 1310, a disk 1320, and a spring 1400.

First, an inlet hole 1111 connected to an inlet pipe 1500 forming a flow path 1510 through which a fluid is transferred, a space portion 1112 in which the fluid supplied to an inside of the valve main body 1100 through the inlet pipe 1500 stays, and a discharge hole 1113 through which the fluid supplied to the space portion 1112 is discharged to the outside are formed in the valve main body 1100.

The valve main body 1100 may serve as a housing for the valve, may be formed in a bar shape in which the inlet hole 1111 faces the discharge hole 1113, or in a 'T' or 'L' shape in which the inlet hole 1111 is disposed to be perpendicular to the discharge hole 1113, and may also be formed to have various types other than above-described shapes. In addition, flanges 1115 may be formed on outer circumferential surfaces of the inlet hole 1111 and the discharge hole 1113.

For reference, the inlet hole 1111 is connected to the inlet pipe 1500, and the discharge hole 1113 is connected to a discharge pipe. The flanges 1115 may be formed at portions at which the inlet hole 1111 and the discharge hole 1113 are in contact with the inlet pipe 1500 and the discharge pipe respectively, and the inlet hole 1111 and the discharge hole 1113 may be respectively connected to the inlet pipe 1500 and the discharge pipe by bolts. In addition, protrusions or grooves may also be formed at end portions at which the inlet hole 1111 and the discharge hole 1113 are in contact with the inlet pipe 1500 and the discharge pipe respectively, and the inlet hole 1111 and the discharge hole 1113 may be respectively connected to the inlet pipe 1500 and the discharge pipe by coupling units such as a ring joint, a groove joint, or the like. In addition, the inlet pipe 1500 and the discharge pipe may be fitted to the inlet hole 1111 and the discharge hole 1113 respectively, and the inlet hole 1111 and the discharge hole 1113 may also be connected to the inlet pipe 1500 and the discharge pipe through welding processes.

The valve main body 1100 may be installed on a bottom surface 1, and a height control unit 1600 for adjusting a distance between the bottom surface 1 and the valve main body 1100 may be separately formed outside the valve main body 1100.

In addition, an emergency exit port which may discharge a fluid contained in the valve main body 1100 to the outside or through which a fluid may be supplied from the outside in an emergency may be formed in the valve main body 1100. The emergency exit port may be normally blocked by a cap to be opened in an emergency.

One end of the shaft 1200 is positioned inside the valve main body 1100, and the other end is positioned outside the valve main body 1100 and connected to a handle 1220, and a hollow 1210 is formed at one side of the shaft 1200 positioned inside the valve main body 1100.

As described above, one end portion of the shaft 1200 is positioned inside the valve main body 1100, and the end portion passes through the valve main body 1100 and is positioned outside the valve main body 1100. The handle 1220 for rotating the shaft 1200 is installed at an end portion of the shaft 1200 which is positioned outside the valve main body 1100.

Since the handle 1220 is disposed outside the valve main body 1100, an operator may manipulate the handle 1220 from an outside of the valve main body 1100. As an example, when the handle 1220 is rotated in the clockwise (or counterclockwise) direction, the shaft 1200 may move forward toward an inside of the valve main body 1100, and when the handle 1220 is rotated in the counterclockwise (or clockwise) direction, the shaft 1200 may move backward toward the outside of the valve main body 1100.

The hollow 1210 is formed at one side of the shaft 1200 positioned inside the valve main body 1100. The hollow 1210 may be formed to be inwardly concave from one end surface of the shaft 1200 to be parallel to a longitudinal direction of the shaft 1200, an opening connecting the hollow 1210 to the outside is formed in the one end surface of the shaft 1200.

A fluid passage 1311 is formed inside the central shaft 1310 to be parallel to the longitudinal direction, an outlet hole 1312 through which the fluid passage 1311 communicates with the outside is formed in one side of the central shaft 1310, and an inlet hole 1313 through which the fluid passage 1311 communicates with the outside is formed in the other side thereof. The central shaft 1310 is fitted to the hollow 1210 of the shaft 1200 such that the other side of the central shaft 1310 in which the inlet hole 1313 is formed may be moved to an inside or outside of a hollow of the shaft 1200.

One end of the central shaft 1310 is disposed at one side of the disk 1320, and the other end of the central shaft 1310 is disposed at the other side of disk 1320. In addition, while the other side of the central shaft 1310 is fitted to the hollow 1210 of the shaft 1200 and linearly moved in both directions, the inlet hole 1313 may be moved to an inside or outside of the shaft 1200.

In a state in which the disk 1320 blocks the opening 1520 of the inlet pipe 1500, the one end of central shaft 1310 in which the outlet hole 1312 is formed is positioned inside the inlet pipe 1500. Here, when the inlet hole 1313 is positioned inside the shaft 1200, the inlet hole 1313 is blocked by the shaft 1200 so that a fluid may not be introduced through the inlet hole 1313. However, when the inlet hole 1313 is positioned outside the shaft 1200, the inlet hole 1313 may be opened so that the fluid may be introduced through the inlet hole 1313, pass through the fluid passage 1311, and be discharged through the outlet hole 1312. The fluid discharged through the outlet hole 1312 as described above may be supplied to the inlet pipe 1500.

Figure 12:
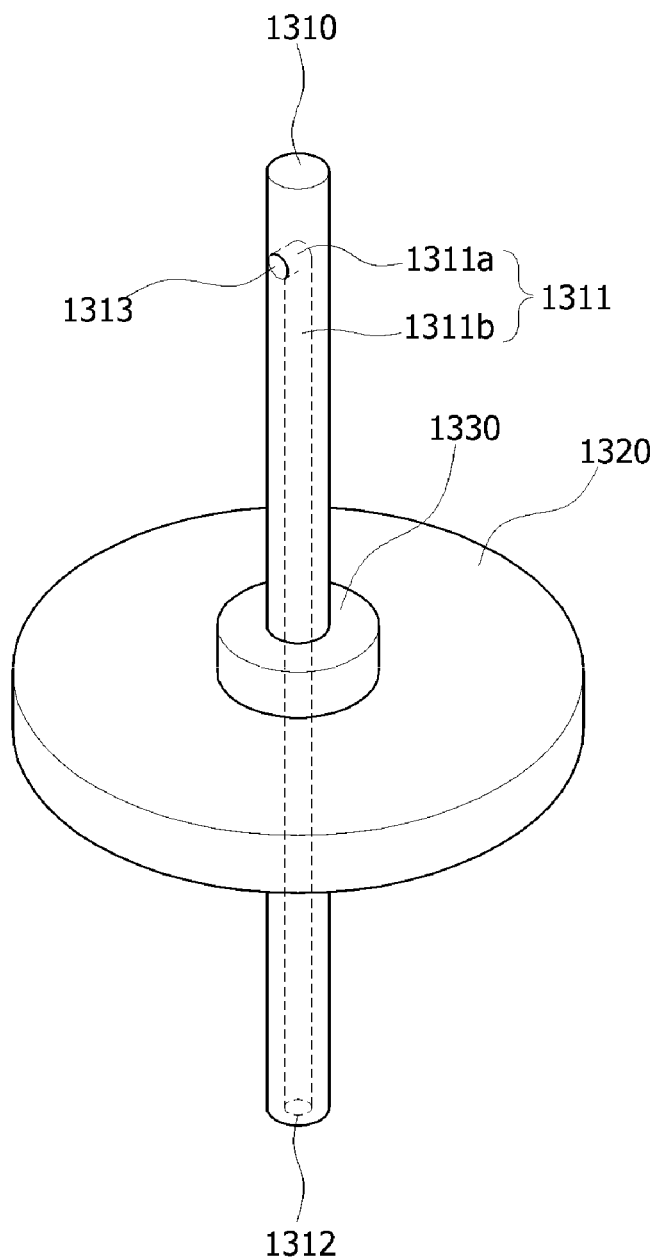
FIG. 12 is a perspective view illustrating a central shaft and a disk selected from the check valve of FIG. 8.

FIG. 12 is a perspective view illustrating a central shaft and a disk selected from the check valve of FIG. 8.

As illustrated in FIG. 12, the fluid passage 1311 may include a horizontal portion 1311b in which one side of the horizontal portion 1311b communicates with the outlet hole 1312 and which is formed in an axial direction of the central shaft 1310, and a vertical portion 1311a in which one side of the vertical portion 1311a communicates with the inlet hole 1313 and the other side thereof communicates with the horizontal portion 1311b and which is formed in a radial direction of the central shaft 1310.

That is, the fluid passage 1311 may have an 'L' shape such that the outlet hole 1312 formed in the one end surface of the central shaft 1310 communicates with the inlet hole 1313 formed in the other side surface of the central shaft 1310.

The disk 1320 is integrally fixed to one side of the central shaft 1310 and opens or closes the inlet hole 1111 or the opening 1520 of inlet pipe 1500 while moving in frontward or backward direction with the central shaft 1310.

As described above, the disk 1320 may be formed in a circular shape and use the shaft 1200 as a guide, with the central shaft 1310 fixed to the center of the disk 1320 to move toward the inlet hole 1111 or the opening 1520 of inlet pipe 1500 to block the inlet hole 1111 or the opening 1520 of inlet pipe 1500, or to move toward the handle 1220 to open the inlet hole 1111 or the opening 1520 of inlet pipe 1500. When the inlet hole 1111 or the opening 1520 of inlet pipe 1500 is opened, a fluid transferred to the inlet pipe 1500 may be introduced in the valve main body 1100, and when the inlet hole 1111 or the opening 1520 of inlet pipe 1500 is blocked, a fluid transferred to the inlet pipe 1500 is not introduced into the valve main body 1100, and the fluid in the main body 1100 is not discharged to the inlet pipe 1500.

In addition, an end portion of the inlet pipe 1500 may pass through the inlet hole 1111 and be positioned inside the valve main body 1100, and the disk 1320 may open or close the end portion of the inlet pipe 1500.

In the above-described embodiment, although it has been clearly described that the disk 1320 may open or close the inlet hole 1111 or the opening 1520 of inlet pipe 1500, in a case in which the end portion of the inlet pipe 1500 passes through the inlet hole 1111 and is positioned inside the valve main body 1100, the disk 1320 may open or close the opening 1520 formed in the end portion of the inlet pipe 1500.

A compression spring may be provided as the spring 1400 which is disposed between the disk 1320 and an inner surface of the valve main body 1100 and supplies an elastic reaction force to the disk 1320. More specifically, the spring 1400 provides a pressing force which pushes the disk 1320 toward the inlet hole 1111 or the opening 1520 of inlet pipe 1500. Here, the shaft 1200 and the central shaft 1310 are disposed to pass through an inside of the spring 1400.

In the check valve configured as described above, the inlet hole 1111 or the opening 1520 of inlet pipe 1500 may be blocked by the disk 1320 due to a pressing force of the spring 1400. In addition, while the spring 1400 is contracted due to a pressure of a fluid supplied to the inlet pipe 1500, the disk 1320 may move toward the handle 1220, and the inlet hole 1111 or the opening 1520 of inlet pipe 1500 may also be opened.

As illustrated in FIG. 8, in a case in which a fluid is not transferred to the inlet pipe 1500 or an amount of fluid is small, since a fluid pressure, which pushes the disk 1320 having blocked the opening 1520 of the inlet pipe 1500 due to a pressure of the spring 1400 toward the handle 1220, is not generated, the disk 1320 may continuously block the opening 1520 of the inlet pipe 1500. In addition, in a state in which a fluid fills the valve main body 1100, a state in which the disk 1320 blocks the opening 1520 of the inlet pipe 1500 is inevitably maintained due to a pressure of the fluid.

On the other hand, as illustrated in FIG. 9, when a fluid is supplied to the inlet pipe 1500 and a fluid pressure applied from the inlet pipe 1500 is greater than a pressing force of the spring 1400, the spring 1400 may be contracted due to the fluid pressure, the disk 1320 having blocked the opening 1520 of the inlet pipe 1500 may move toward the handle 1220, the opening 1520 of the inlet pipe 1500 may be opened, and a fluid transferred to the inlet pipe 1500 may be introduced into the valve main body 1100.

Figure 10:
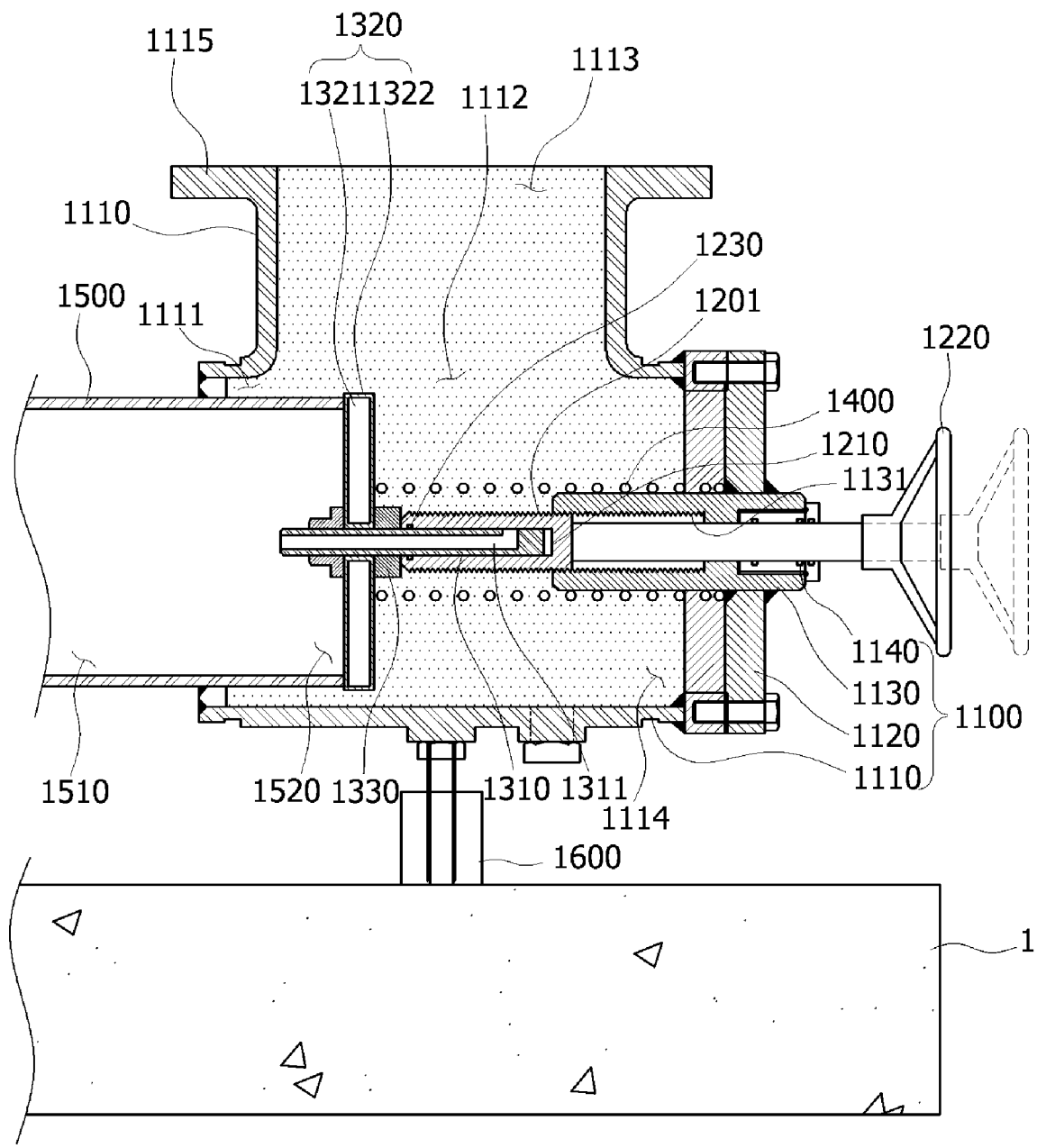
FIG. 10 is a cross-sectional view illustrating a state in which the check valve having the reverse-direction fluid supply function according to the third embodiment of the present invention is forcibly blocked.

FIG. 10 is a cross-sectional view illustrating a state in which the check valve having the reverse-direction fluid supply function according to the third embodiment of the present invention is forcibly blocked.

Referring to FIG. 10, the shaft 1200 may press the disk 1320 toward the inlet hole 1111 or the opening 1520 of inlet pipe 1500.

The shaft 1200 moves forward or backward toward the disk 1320 to provide a pressing force which presses the disk 1320 against the inlet hole 1111 or the opening 1520 of inlet pipe 1500 so that the disk 1320 forcibly blocks the inlet hole 1111 or the opening 1520 of the inlet pipe 1500.

That is, when the one end surface of the shaft 1200 is positioned to be in contact with the disk 1320 or a connecting member 1330 connecting the disk 1320 and the central shaft 1310 and the disk 1320 is pressed by rotating the shaft 1200, the disk 1320 may be fixedly pressed against the inlet hole 1111 or the opening 1520 of inlet pipe 1500. Here, even when a fluid is transferred to the inlet pipe 1500 and a fluid pressure is applied to the disk 1320, since the one end surface of the shaft 1200 forcibly pushes the disk 1320, the disk 1320 may not move and a state in which the inlet hole 1111 or the opening 1520 of inlet pipe 1500 is blocked may be maintained.

In addition, an extent of opening performed by the disk 1320 and a flow rate of a fluid introduced into the valve main body 1100 may be adjusted by the shaft 1200. Since the shaft 1200 moves forward or backward toward the disk 1320, a gap between the shaft 1200 and the disk 1320 may be adjusted. Accordingly, when the gap between the disk 1320 and the one end surface of the shaft 1200 facing disk 1320 decreases, a moving distance of the disk 1320 is inevitably restricted to a short distance, and when a fluid is transferred to the inlet pipe 1500 and a fluid pressure is applied to the disk 1320, opening may be performed by the disk 1320 to a restricted distance and a flow rate of the fluid introduced into the valve main body 1100 may be adjusted.

On the other hand, when the gap between the disk 1320 and the one end surface of the shaft 1200 facing the disk 1320 increases, the moving distance of the disk 1320 may inevitably increase, and when a fluid is transferred to the inlet pipe 1500 and a fluid pressure is applied to the disk 1320, opening may be performed by the disk 1320 to an increased distance and a flow rate of the fluid introduced into the valve main body 1100 may increase relatively.

As described above, although the blocking may be forcibly performed by the disk 1320 or the opening extent may be adjusted by the disk 1320 while the one end surface of the shaft 1200 comes into contact with the disk 1320, an inner surface of the hollow 1210 formed in the shaft 1200 also presses an end portion of the central shaft 1310 inserted into the hollow 1210 to forcibly perform blocking of the disk 1320 or restrict an extent of opening performed by of the disk 1320 while the one end surface of the shaft 1200 does not come into contact with the disk 1320.

Figure 11:
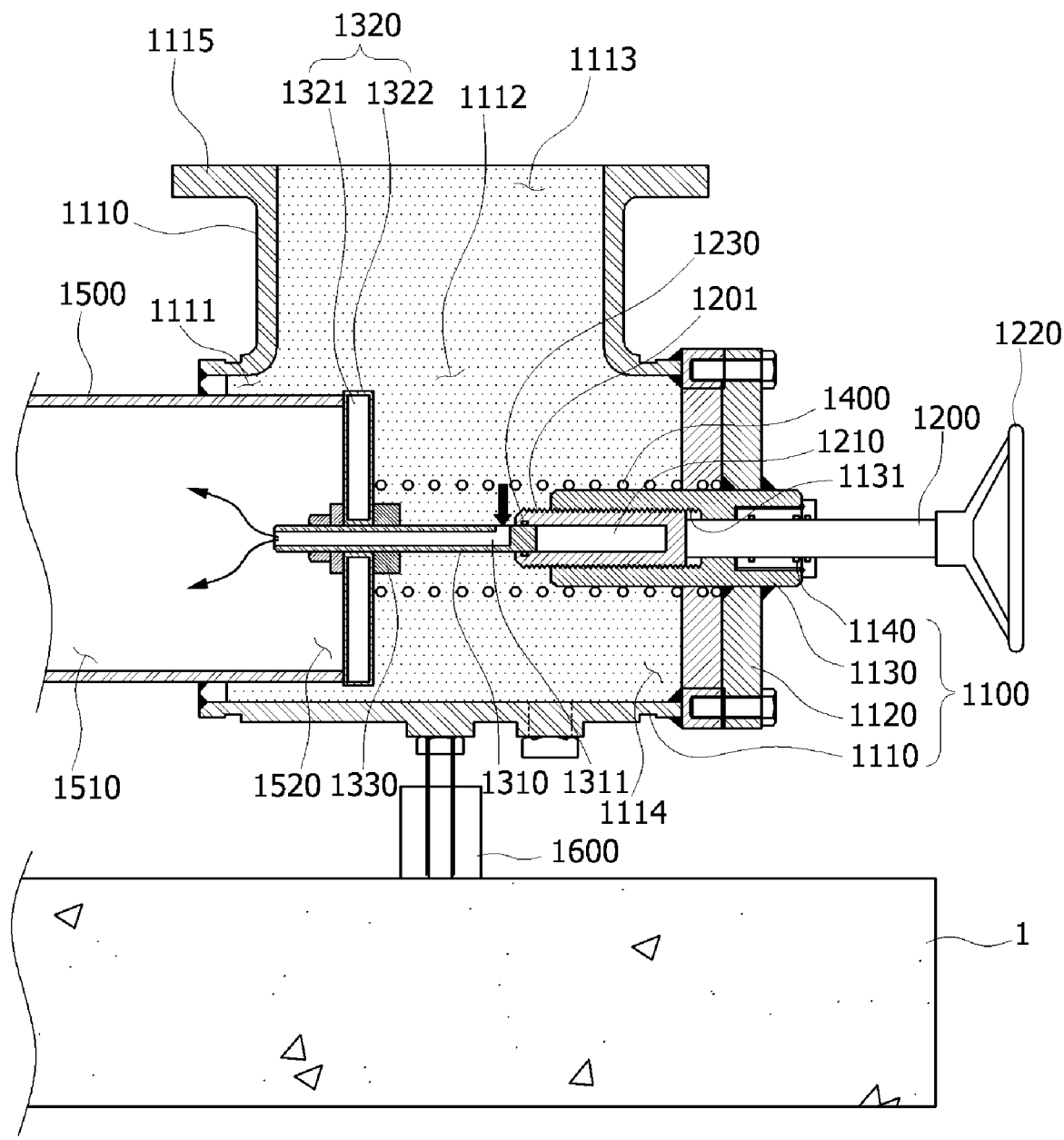
FIG. 11 is a cross-sectional view illustrating a state in which a fluid passage of the check valve having the reverse-direction fluid supply function according to the third embodiment of the present invention is opened and a fluid is supplied in a reverse direction.

FIG. 11 is a cross-sectional view illustrating a state in which a fluid passage of the check valve having the reverse-direction fluid supply function according to the third embodiment of the present invention is opened and a fluid is supplied in a reverse direction.

That is, in a state in which the disk 1320 blocks the opening 1520 of the inlet pipe 1500, in a case in which a fluid which fills the valve main body 1100 needs to be resupplied to the inlet pipe 1500, when the shaft 1200 is moved backward toward the handle 1220 by rotating the handle 1220 in one direction, the inlet hole 1313 may be exposed to an outside of the shaft 1200, and a fluid of the valve main body 1100 which is introduced into the inlet hole 1313 may be resupplied to the inlet pipe 1500 through the fluid passage 1311 and the outlet hole 1312.

Next, when a necessary amount of fluid is resupplied to the inlet pipe 1500, the inlet hole 1313 is adjusted to be accommodated in the shaft 1200 by rotating the handle 1220 again in the other direction. When the inlet hole 1313 is accommodated in the shaft 1200, the inlet hole 1313 is blocked again, and the fluid is not discharged through the fluid passage 1311.

In addition, the inlet hole 1111 is formed at one side of the valve main body 1100, an exit hole 1114 is formed at the other side, the discharge hole 1113 is formed in a direction perpendicular to a direction from the inlet hole 1111 to the exit hole 1114, and the valve main body 1100 may include a body portion 1110 having a 'T' shape and forming a space portion 1112 communicating with the inlet hole 1111, the exit hole 1114, and the discharge hole 1113 at an inside thereof, and a cap portion 1120 which blocks the exit hole 1114 of the body portion 1110.

Here, the spring 1400 is fitted between the disk 1320 and an inner surface of the cap portion 1120 which is disposed to face the disk 1320.

Accordingly, when the handle 1220 is rotated in a position facing the inlet pipe 500, the shaft 1200 may be moved forward or backward, and an extent of opening performed by the disk 1320 may be restricted or forcible blocking of the disk 1320 may be performed according to an extent of forward or backward movement of the shaft 1200.

When the opening 1520 of the inlet pipe 1500 is opened, a fluid in the inlet pipe 1500 may pass through the valve main body 1100, be discharged through the discharge hole 1113 disposed perpendicularly above or below the opening 1520, and be supplied to the discharge pipe.

In addition, the valve main body 1100 may further include a nut member 1130 which is hollow, which is disposed to pass through a center of the cap portion 1120, and which includes a thread 1131 formed on an inner circumferential surface thereof, and the shaft 1200 includes a thread 1201 formed on an outer circumferential surface thereof, is fitted to the nut member 1130, and rotates to linearly move in the both directions.

Here, one end of the nut member 1130 may be positioned inside the valve main body 1100, and the other end may be positioned outside the valve main body 1100, and the nut member 1130 and the cap portion 1120 may be connected through a welding method and the like. In addition, a sealing member 1140 for blocking a fluid flow may be formed between the nut member 1130 and the shaft 1200.

Accordingly, when the handle 1220 positioned outside the valve main body 1100 is rotated, the shaft 1200 inserted into the nut member 1130 may be moved forward or backward. Here, since the nut member 1130 is fixed to the cap portion 1120, the nut member 1130 is not rotated, and only the shaft 1200 is rotated to move forward or backward according to a rotating direction of the shaft 1200.

In addition, a sealing member 1230 which is formed of an elastic material and protrudes toward a center of the shaft 1200 in a circumferential direction may be formed on an inner surface of the hollow 1210 of the shaft 1200.

The sealing member 1230 blocks a gap between the hollow 1210 and the central shaft 1310 fitted to the hollow 1210 so that a fluid is not introduced through the gap. Here, an inner diameter of the sealing member 1230 may be less than an outer diameter of the central shaft 1310.

As an example, when the inlet hole 1313 which communicates with the fluid passage 1311 is positioned inside the hollow 1210 from the sealing member 1230, the gap between the hollow 1210 and the central shaft 1310 is perfectly blocked by the sealing member 1230 and thus a fluid may not be introduced through the inlet hole 1313. On the other hand, when the inlet hole 1313 is positioned outside the hollow 1210 from the sealing member 1230, a fluid in the valve main body 1100 may be introduced through the inlet hole 1313 and discharged to the inlet pipe 1500 through the fluid passage 1311 and the outlet hole 1312.

The disk 1320 may include a disk member 1321 having a hollow central portion and formed of a metal material, and a cover member 1322 formed of an elastic material and formed to cover an outer portion of the disk member 1321.

The disk member 1321 is for reinforcing the disk 1320 and is formed of a metal material. The cover member 1322 is formed of an elastic material such as rubber and the like and configured to cover an outer side of the disk member 1321. The disk member 1321 and the cover member 1322 may be integrally formed through an insert-injection method. When the disk 1320 includes the disk member 1321 and the cover member 1322 as described above, strength of the disk 1320 may be increased due to an effect of the disk member 1321, a pressing force of the disk 1320 against the inlet hole 1111 or the opening 1520 of inlet pipe 1500 may be increased and buffering between the disk 1320 and the opening 1520 may be performed due to an effect of the cover member 1322.

Figure 13:
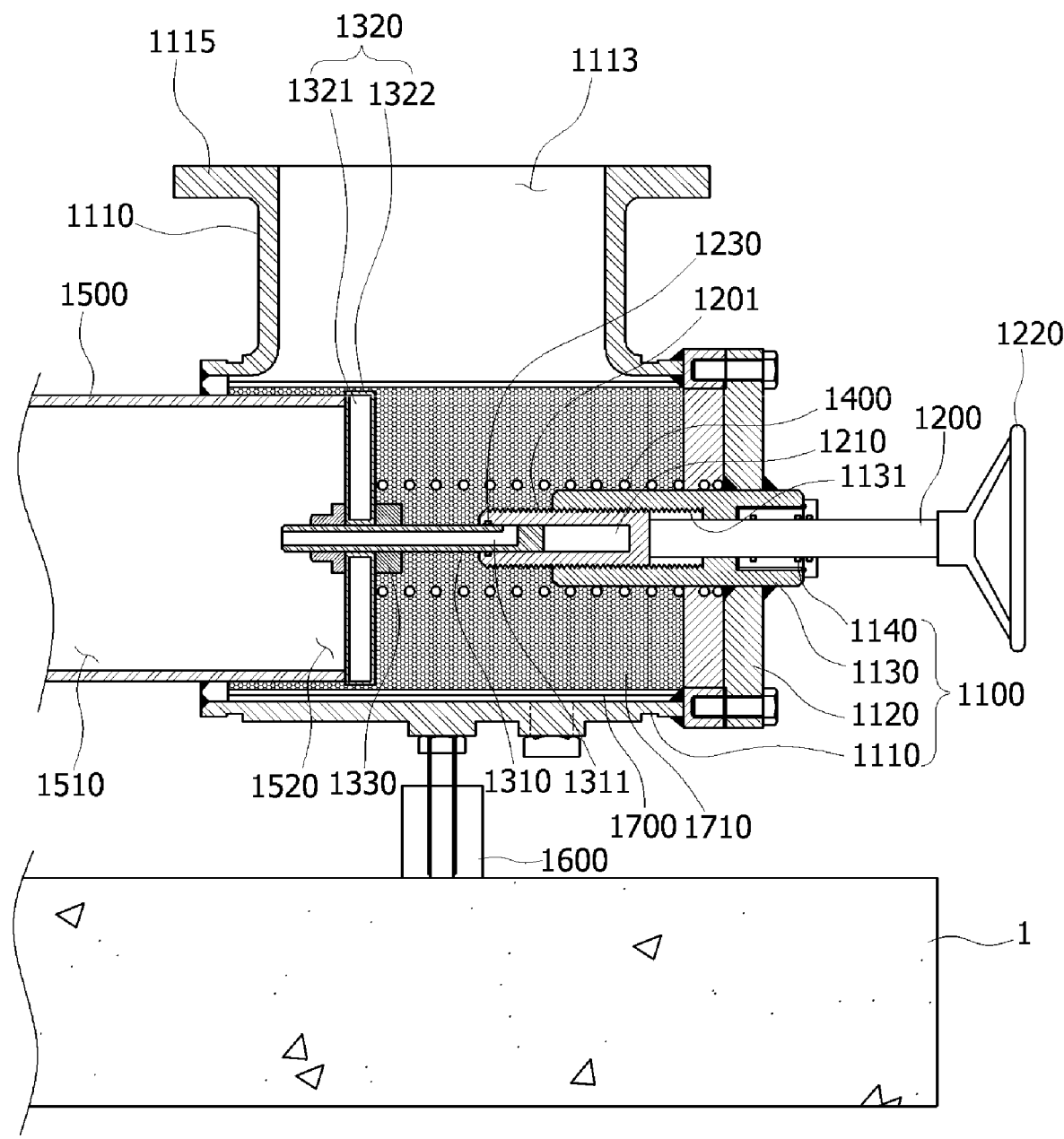
FIG. 13 is a cross-sectional view illustrating a check valve having a reverse-direction fluid supply function according to a fourth embodiment of the present invention.

FIG. 13 is a cross-sectional view illustrating a check valve having a reverse-direction fluid supply function according to a fourth embodiment of the present invention.

Referring to FIG. 13, a strainer 1700 for filtering out foreign materials from a fluid introduced through an inlet hole 1111 and discharged through a discharge hole 1113 may be formed between the inlet hole 1111 and the discharge hole 1113 of a valve main body 1100.

As an example, a mesh including a plurality of filter holes may be provided as the strainer 1700 and may be formed at the inlet hole 1111, the discharge hole 1113, or an opening 1520 of an inlet pipe 1500.

As another example, the strainer 1700 may be formed in a hollow pipe shape, and include a plurality of filter holes 1710 formed on a side surface thereof. In addition, the strainer 1700 may be disposed in parallel to a shaft 1200, and the shaft 1200, the central shaft 1310, and a disk 1320 may be accommodated inside the strainer 1700, and the opening 1520 of the inlet pipe 1500 may also be positioned inside the strainer 1700. Accordingly, foreign materials contained in a fluid introduced through the opening 1520 of the inlet pipe 1500 may be filtered out by the strainer 1700, and the fluid may be discharged through the discharge hole 1113.

Figure 14:
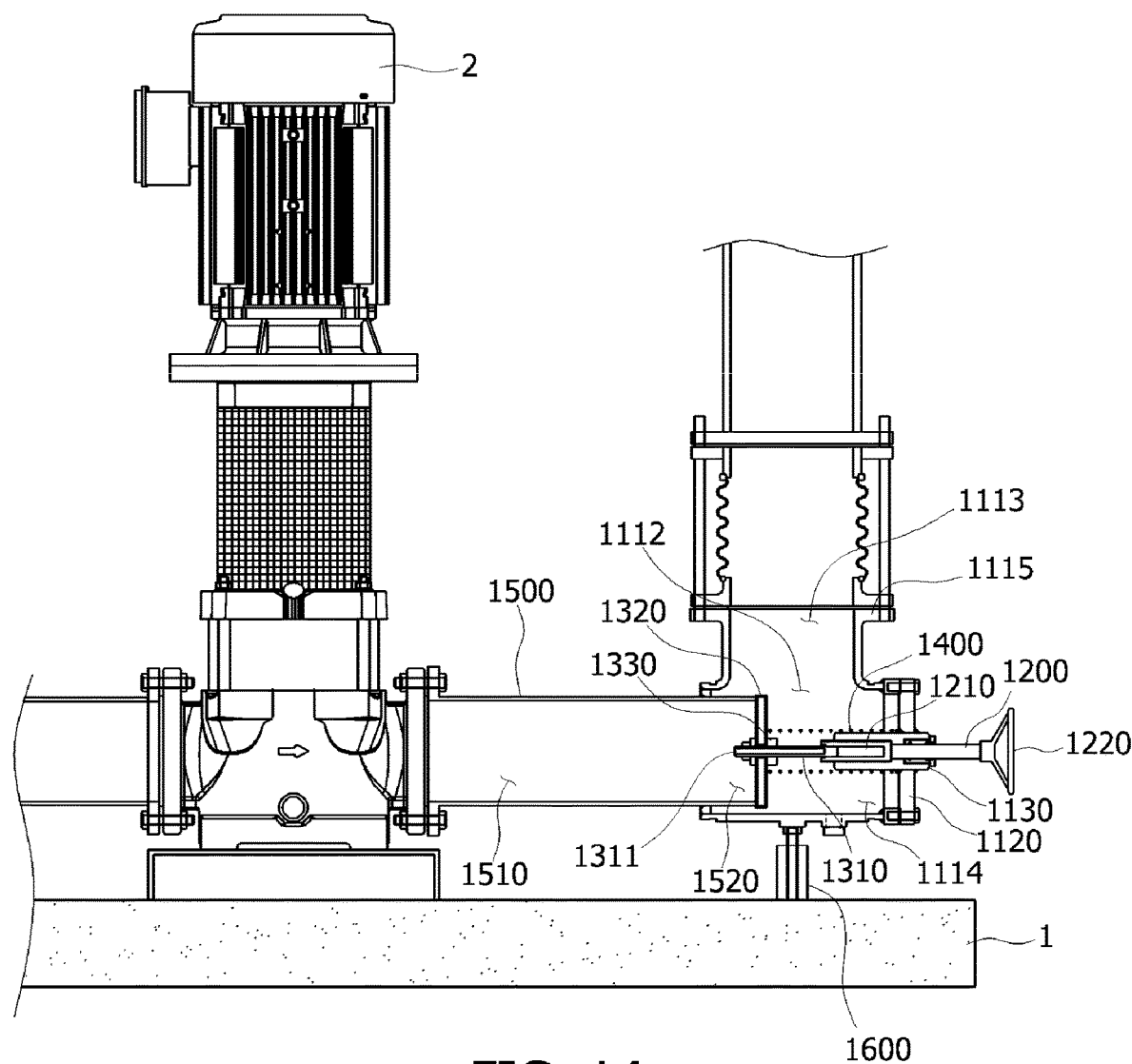
FIG. 14 is a cross-sectional view illustrating a fluid supply system in which the check valve having the reverse-direction fluid supply function according to the third embodiment of the present invention is installed.

FIG. 14 is a cross-sectional view illustrating a fluid supply system in which the check valve having the reverse-direction fluid supply function according to the third embodiment of the present invention is installed.

An operation of the check valve having the reverse-direction fluid supply function and the above-described structure will be described below according to a situation.

First, when a pump 2 is driven to transfer a fluid to the inlet pipe 1500, while the disk 1320 having blocked the opening 1520 of the inlet pipe 1500 due to a pressure of the fluid transferred to the inlet pipe 1500 is pushed toward an inside of the valve main body 1100, the fluid in the inlet pipe 1500 is introduced into the valve main body 1100. Next, when the driving of the pump 2 is stopped and the fluid is not transferred to the inlet pipe 1500, a fluid pressure applied to the disk 1320 is removed, and the disk 1320 blocks the opening 1520 of the inlet pipe 1500 again due to an elastic restoring force of the spring 1400.

Meanwhile, in a case in which a fluid in the valve main body 1100 is resupplied to the inlet pipe 1500 to drive the pump 2 in a situation in which the disk 1320 blocks the opening 1520 of the inlet pipe 1500, the inlet hole 1313 which communicates with the fluid passage 1311 is exposed to an outside of the shaft 1200 by rotating the handle 1220 in a normal direction, and the fluid in valve main body 1100 may be resupplied to the inlet pipe 1500 through the inlet hole 1313, the fluid passage 1311, and the outlet hole 1312. Next, when the fluid is completely supplied to the inlet pipe 1500, the inlet hole 1313 is positioned inside the shaft 1200 to block the inlet hole 1313 by rotating the handle 1220 in the reverse direction so that the fluid is not discharged through the inlet hole 1313 and the fluid passage 1311 anymore.

In addition, in a case in which the opening 1520 of the inlet pipe 1500 needs to be forcibly blocked, one end surface of the shaft 1200 is pressed against the disk 1320 by rotating the handle 1220. When the one end surface of the shaft 1200 is pressed against the disk 1320, since the disk 1320 is supported by the one end surface of the shaft 1200 even when a fluid is transferred through the inlet pipe 1500 and a fluid pressure is applied to the disk 1320, the disk 1320 may not open, and thus the opening 1520 of the inlet pipe 1500 may be forcibly blocked.

In addition, in a case in which a flow rate introduced into the valve main body 1100 needs to be adjusted, a distance between the disk 1320 and the one end surface of the shaft 1200 is adjusted to a desired distance by rotating the handle 1220. When the distance between the disk 1320 and the one end surface of the shaft 1200 is adjusted, since an extent of opening performed by the disk 1320 is adjusted, a flow rate of a fluid introduced into the valve main body 1100 from the inlet pipe 1500 may be adjusted.

According to the above-described present invention, there are advantages in that an opening of an inlet pipe and an inlet hole, through which a fluid is introduced, may be opened due to a fluid pressure, the inlet hole and the opening of the inlet pipe may be forcibly blocked instead of being opened even when the fluid pressure is applied thereto, an opening extent thereof may be adjusted even when the inlet hole and the opening are opened due to the fluid pressure, and the fluid introduced into a valve main body through the inlet pipe may be resupplied to the inlet pipe as necessary.

The embodiments and accompanying drawings illustrated in the present specification have been merely described as examples of the technical spirit of the present invention. Therefore, since the embodiments described in the present invention are considered in a descriptive sense only and not for purposes of limitation, it is clear that the technical scope of the present invention is not limited the embodiments. All modified and specific embodiments which may be easily inferred by those skilled in the art within a technical range included in the specification and the drawings of the present invention may be interpreted as being included in the appended claims of the present invention.

The invention claimed is:

1. A check valve having a reverse-direction fluid supply function, the check valve comprising:
   a valve main body into which a fluid is introduced, wherein the valve main body includes:
      a body portion in which an inlet hole connected to an inlet pipe providing a flow path is formed at one side of the body portion, an exit hole is formed at the other side, and a discharge hole is formed in a direction perpendicular to a direction from the inlet hole to the exit hole; and
      a cap portion which blocks the exit hole;
   a shaft installed in the valve main body and configured to move forward toward an inside of the valve main body or backward toward an outside of the valve main body;
   a disk disposed in the valve main body and configured to open or close the valve main body; and
   a spring interposed between the disk and an inner surface of the valve main body,
   a central shaft inserted into a hollow formed in the shaft, wherein, in the central shaft:
      a fluid passage is formed at an inside;
      an outlet hole which communicates with the fluid passage is formed at one side;
      a second inlet hole which communicates with the fluid passage is formed at the other side: and
      the other side is fitted to the hollow such that the second inlet hole is movable to or from the hollow, and
      the disk is integrally fixed to the central shaft,
   wherein, in a case in which a fluid pressure of the fluid is applied to the disk, the disk opens the valve main body due to the fluid pressure of the fluid or blocks the valve main body due to movement of the shaft, and in a case in which the fluid pressure of the fluid is removed, the disk blocks the valve main body due to an elastic reaction force of the spring.

2. The check valve of claim 1, wherein:
   the valve main body further includes a nut member which is hollow, which is disposed to pass through a center of the cap portion, and which includes a thread formed on an inner circumferential surface of the nut member; and
   the shaft includes a thread formed on an outer circumferential surface of the shaft and is fitted to the nut member.

3. The check valve of claim 1, wherein:
an end portion of the inlet pipe passes through the inlet hole and is positioned in the valve main body; and
the disk opens or closes the end portion of the inlet pipe.

4. The check valve of claim 1, wherein the disk includes:
a disk member including a hollow at a central portion of the disk and formed of a metal material; and
a cover member formed of an elastic material and formed to cover an outer portion of the disk member.

5. The check valve of claim 1, wherein a sealing member which is formed of an elastic material and which protrudes toward a center of the hollow in a circumferential direction of the hollow is formed on an inner surface of the hollow of the shaft.

6. The check valve of claim 1, wherein the fluid passage includes:
a vertical portion which communicates with the outlet hole and which is formed in parallel to a longitudinal direction of the central shaft; and
a horizontal portion in which one side of the horizontal portion communicates with the second inlet hole, in which the other side thereof communicates with the vertical portion, and which is formed in parallel to a diameter direction of the central shaft.

7. A check valve having a reverse-direction fluid supply function, the check valve comprising:
a valve main body into which a fluid is introduced;
a shaft installed in the valve main body and configured to move forward toward an inside of the valve main body or backward toward an outside of the valve main body;
a disk disposed in the valve main body and configured to open or close the valve main body; and
a spring interposed between the disk and an inner surface of the valve main body,
wherein, in a case in which a fluid pressure of the fluid is applied to the disk, the disk opens the valve main body due to the fluid pressure of the fluid or blocks the valve main body due to movement of the shaft, and in a case in which the fluid pressure of the fluid is removed, the disk blocks the valve main body due to an elastic reaction force of the spring,
wherein a groove in which an outer diameter of the shaft decreases is formed in one section of the shaft positioned in the inlet pipe; and a fluid passage to which the shaft is fitted is formed in a central portion of the disk, and
wherein the groove includes:
a first inclined section and a second inclined section in which the outer diameters of the first and second inclined sections symmetrically decrease, and wherein the first inclined section is symmetrical with the second inclined section; and
a horizontal section in which an outer diameter is constantly maintained between the first and second inclined sections.

8. The check valve of claim 7, wherein a guide member configured to support one end of the shaft is formed in the inlet pipe.

9. The check valve of claim 7 wherein a stopper which protrudes in a circumferential direction of the shaft to press the disk toward the inlet hole or the opening of the inlet pipe is formed on an outer circumferential surface of the shaft.

10. The check valve of claim 7, wherein a sealing member which is formed of an elastic material and which protrudes toward a center of the fluid passage in a circumferential direction of the fluid passage is formed in the disk.

11. The check valve of claim 10, wherein the sealing member is formed at each of both sides of the fluid passage.

* * * * *